(12) United States Patent
Silvanto et al.

(10) Patent No.: US 11,073,954 B2
(45) Date of Patent: Jul. 27, 2021

(54) KEYBOARD WITH ADAPTIVE INPUT ROW

(71) Applicant: Apple Inc., Cupertino, CA (US)

(72) Inventors: Mikael M. Silvanto, Cupertino, CA (US); Erik A. Zweigle, Cupertino, CA (US); Jun Qi, Cupertino, CA (US); Christiaan A. Ligtenberg, Cupertino, CA (US); Robert Y. Cao, Cupertino, CA (US); Bartley K. Andre, Cupertino, CA (US); Molly J. Anderson, Cupertino, CA (US); ByoungSuk Kim, Cupertino, CA (US); Dinesh C. Mathew, Cupertino, CA (US); Victor H. Yin, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/261,847

(22) Filed: Sep. 9, 2016

(65) Prior Publication Data

US 2017/0090596 A1     Mar. 30, 2017

Related U.S. Application Data

(60) Provisional application No. 62/234,950, filed on Sep. 30, 2015.

(51) Int. Cl.
*G06F 3/023*     (2006.01)
*G06F 3/02*      (2006.01)
(Continued)

(52) U.S. Cl.
CPC .............. *G06F 3/0446* (2019.05); *G06F 3/02* (2013.01); *G06F 3/0231* (2013.01);
(Continued)

(58) Field of Classification Search
None
See application file for complete search history.

(56) References Cited

U.S. PATENT DOCUMENTS

| 5,212,356 | A | 5/1993 | English |
| 5,748,177 | A | 5/1998 | Baker et al. |
| (Continued) | | | |

FOREIGN PATENT DOCUMENTS

| CN | 1862732 | 11/2006 |
| CN | 101071354 | 11/2007 |
| (Continued) | | |

OTHER PUBLICATIONS

Rekimoto, Jun, "Thumbsense: Automatic Input Mode Sensing for Touch-Based Interactions," Interaction Laboratory, Sony Computer & Science Laboratories, Inc., 2 pages, Apr. 2003.

*Primary Examiner* — Ifedayo B Iluyomade
(74) *Attorney, Agent, or Firm* — Dorsey & Whitney LLP

(57) ABSTRACT

Embodiments related to an electronic device having an adaptive input row. The adaptive input row may be positioned within an opening of a device and include a cover for receiving a touch and a display that is configured to present an adaptable set of indicia. The adaptive input row may also include one or more sensors for detecting the location of a touch and/or the magnitude of a force of the touch. The adaptive input row may be positioned adjacent or proximate to a keyboard of the electronic device.

20 Claims, 15 Drawing Sheets

(51) Int. Cl.
  *G06F 3/041* (2006.01)
  *G06F 3/044* (2006.01)
  *G06F 3/0488* (2013.01)
  *G06F 3/0354* (2013.01)

(52) U.S. Cl.
  CPC .......... *G06F 3/0238* (2013.01); *G06F 3/0416* (2013.01); *G06F 3/0443* (2019.05); *G06F 3/0445* (2019.05); *G06F 3/0447* (2019.05); *G06F 3/04886* (2013.01); *G06F 3/03547* (2013.01); *G06F 3/04883* (2013.01); *G06F 2203/0339* (2013.01); *G06F 2203/04104* (2013.01); *G06F 2203/04105* (2013.01); *G06F 2203/04111* (2013.01)

(56) References Cited

U.S. PATENT DOCUMENTS

| | | |
|---|---|---|
| 5,920,303 A | 7/1999 | Baker et al. |
| 6,029,214 A | 2/2000 | Dorfman et al. |
| 6,429,846 B2 | 8/2002 | Rosenberg et al. |
| 6,730,863 B1 | 5/2004 | Gerpheide et al. |
| 6,822,640 B2 | 11/2004 | Derocher |
| 7,301,532 B1 | 11/2007 | Dobry |
| 7,683,890 B2 | 3/2010 | Geaghan |
| 7,847,789 B2 | 12/2010 | Kolmykov-Zotov et al. |
| 8,063,893 B2 | 11/2011 | Rosenberg et al. |
| 8,077,057 B2 | 12/2011 | Ohshita et al. |
| 8,098,233 B2 | 1/2012 | Hotelling et al. |
| 8,248,373 B2 | 8/2012 | Turner et al. |
| 8,335,996 B2 | 12/2012 | Davidson et al. |
| 8,378,975 B2 | 2/2013 | Yoon et al. |
| 8,381,118 B2 | 2/2013 | Minton |
| 8,390,481 B2 | 3/2013 | Pance et al. |
| 8,432,362 B2 | 4/2013 | Cheng et al. |
| 8,537,132 B2 | 9/2013 | Ng et al. |
| 8,537,140 B2 | 9/2013 | Tsai et al. |
| 8,570,280 B2 | 10/2013 | Stewart et al. |
| 8,642,908 B2 | 2/2014 | Moran et al. |
| 8,654,524 B2 | 2/2014 | Pance et al. |
| 8,717,331 B2 | 5/2014 | Kremin et al. |
| 8,743,083 B2 | 6/2014 | Zanone et al. |
| 8,766,922 B2 | 7/2014 | Kim et al. |
| 8,773,146 B1 | 7/2014 | Hills et al. |
| 8,804,347 B2 | 8/2014 | Martisauskas |
| 8,854,325 B2 | 10/2014 | Byrd et al. |
| 8,870,812 B2 | 10/2014 | Alberti et al. |
| 8,952,899 B2 | 2/2015 | Hotelling |
| 8,963,846 B2 | 2/2015 | Lii et al. |
| 9,019,207 B1 | 4/2015 | Hamburgen et al. |
| 9,098,120 B2 | 8/2015 | Huh |
| 9,104,282 B2 | 8/2015 | Ichikawa |
| 9,116,616 B2 | 8/2015 | Kyprianou et al. |
| 9,122,330 B2 | 9/2015 | Bau et al. |
| 9,195,354 B2 | 9/2015 | Bulea et al. |
| 9,201,105 B2 | 12/2015 | Iida et al. |
| 9,213,426 B2 | 12/2015 | Clifton et al. |
| 9,250,738 B2 | 2/2016 | Sharma |
| 9,310,934 B2 | 4/2016 | Ng et al. |
| 9,367,146 B2 | 6/2016 | Piot et al. |
| 9,367,158 B2 | 6/2016 | Hotelling et al. |
| 9,542,097 B2 | 1/2017 | Ganey et al. |
| 9,543,948 B2 | 1/2017 | Curtis et al. |
| 9,635,267 B2 | 4/2017 | Lee et al. |
| 9,753,569 B2 | 9/2017 | Han et al. |
| 9,880,655 B2 | 1/2018 | O'connor |
| 9,904,411 B2 | 2/2018 | Wu et al. |
| 10,126,892 B2 | 11/2018 | Chintalapoodi |
| 2004/0104894 A1 | 6/2004 | Tsukada et al. |
| 2004/0257345 A1 | 12/2004 | Makanae et al. |
| 2006/0061563 A1 | 3/2006 | Fleck |
| 2007/0076859 A1 | 4/2007 | Tzvetanov |
| 2008/0039376 A1 | 2/2008 | Bjorquist et al. |
| 2008/0136792 A1 | 6/2008 | Peng et al. |
| 2008/0272927 A1 | 11/2008 | Woolley et al. |
| 2009/0225052 A1 | 9/2009 | Liu |
| 2010/0265183 A1 | 10/2010 | Mail et al. |
| 2010/0271315 A1 | 10/2010 | Bathiche |
| 2010/0281410 A1* | 11/2010 | Heintze .................. G06F 3/0219 715/769 |
| 2010/0283741 A1* | 11/2010 | Heintze .................. G06F 3/0238 345/173 |
| 2011/0069021 A1 | 3/2011 | Hill |
| 2011/0228075 A1 | 9/2011 | Madden et al. |
| 2011/0314405 A1 | 12/2011 | Turner et al. |
| 2012/0001852 A1 | 1/2012 | Ho et al. |
| 2012/0068933 A1 | 3/2012 | Larsen |
| 2012/0293447 A1 | 11/2012 | Heng et al. |
| 2013/0002534 A1 | 1/2013 | Braun et al. |
| 2013/0169579 A1 | 7/2013 | Havnor |
| 2013/0257797 A1 | 10/2013 | Wu et al. |
| 2014/0043289 A1 | 2/2014 | Stern et al. |
| 2014/0104207 A1 | 4/2014 | Park et al. |
| 2014/0162653 A1 | 6/2014 | Lee et al. |
| 2014/0317564 A1 | 10/2014 | Odell et al. |
| 2014/0347312 A1 | 11/2014 | Siska |
| 2014/0368455 A1* | 12/2014 | Croisonnier ............ G06F 3/044 345/173 |
| 2015/0022481 A1 | 1/2015 | Andersson et al. |
| 2015/0052473 A1 | 2/2015 | Kuscher et al. |
| 2015/0062069 A1 | 3/2015 | Shin et al. |
| 2015/0077394 A1 | 3/2015 | Dai et al. |
| 2015/0123906 A1 | 5/2015 | Mehandjiysky et al. |
| 2015/0169159 A1* | 6/2015 | Yang .................... G06F 3/04817 715/808 |
| 2015/0212545 A1* | 7/2015 | Ding .................... G06F 1/1616 345/168 |
| 2015/0297145 A1 | 10/2015 | Luna et al. |
| 2015/0309589 A1 | 10/2015 | Chang |
| 2015/0355716 A1 | 12/2015 | Balasubramanian et al. |
| 2015/0378496 A1 | 12/2015 | Vandermeijden et al. |
| 2016/0004306 A1 | 1/2016 | Maltz |
| 2016/0098107 A1 | 4/2016 | Morrell et al. |
| 2016/0103496 A1 | 4/2016 | Degner et al. |
| 2016/0147440 A1 | 5/2016 | Leyon |
| 2016/0266717 A1 | 9/2016 | Oral et al. |
| 2016/0282973 A1* | 9/2016 | Kholodenko ............ G06F 3/044 |
| 2016/0334935 A1 | 11/2016 | Jeon |
| 2016/0379605 A1 | 12/2016 | Morobishi |
| 2017/0090594 A1 | 3/2017 | Silvanto et al. |
| 2017/0090597 A1 | 3/2017 | Silvanto et al. |
| 2017/0090654 A1* | 3/2017 | Silvanto ................ G06F 3/0238 |
| 2017/0285866 A1 | 10/2017 | Heim et al. |
| 2017/0315622 A1 | 11/2017 | Morrell et al. |
| 2017/0336891 A1 | 11/2017 | Rosenberg et al. |
| 2017/0336899 A1 | 11/2017 | Szeto |
| 2018/0011548 A1 | 1/2018 | Garelli |

FOREIGN PATENT DOCUMENTS

| | | |
|---|---|---|
| CN | 101482785 | 7/2009 |
| CN | 101609383 | 12/2009 |
| CN | 101641665 A | 2/2010 |
| CN | 101644979 | 2/2010 |
| CN | 201563116 | 8/2010 |
| CN | 102171632 | 8/2011 |
| CN | 102200861 | 9/2011 |
| CN | 102289371 A | 12/2011 |
| CN | 102844729 | 12/2012 |
| CN | 102934052 A | 2/2013 |
| CN | 103164102 | 6/2013 |
| CN | 103176691 | 6/2013 |
| CN | 203260010 | 10/2013 |
| CN | 103384871 | 11/2013 |
| CN | 103455205 | 12/2013 |
| CN | 103577008 | 2/2014 |
| CN | 103634199 A | 3/2014 |
| CN | 104423740 | 3/2015 |
| CN | 104834419 | 8/2015 |
| CN | 104915002 | 9/2015 |
| EP | 0189590 | 6/1986 |
| EP | 2305506 | 4/2011 |
| EP | 2664980 | 11/2013 |

(56) References Cited

FOREIGN PATENT DOCUMENTS

| | | |
|---|---|---|
| FR | 2980004 | 3/2013 |
| JP | H10113969 A | 5/1998 |
| JP | 2001175415 | 6/2001 |
| JP | 2001282433 A | 10/2001 |
| JP | 2005084982 A | 3/2005 |
| JP | 2012033060 A | 2/2012 |
| JP | 2012064108 A | 3/2012 |
| JP | 2014099199 A | 5/2014 |
| JP | 2014157400 A | 8/2014 |
| JP | 2017504128 A | 2/2017 |
| KR | 1020120021721 A | 3/2012 |
| TW | 200912612 | 3/2009 |
| TW | 201419112 | 5/2014 |
| WO | WO2007/032949 | 3/2007 |
| WO | WO2011/159519 | 12/2011 |
| WO | 2013183191 A1 | 12/2013 |
| WO | 2014124165 A2 | 8/2014 |
| WO | WO2014/124173 | 8/2014 |
| WO | WO2014/164628 | 10/2014 |
| WO | 2015112868 A1 | 7/2015 |

\* cited by examiner

KEYBOARD WITH ADAPTIVE INPUT ROW

CROSS-REFERENCE TO RELATED APPLICATION(S)

This application is a nonprovisional patent application of U.S. Provisional Patent Application No. 62/234,950, filed Sep. 30, 2015 and titled "Keyboard with Adaptive Input Row," the disclosure of which is hereby incorporated herein by reference in its entirety.

FIELD

The described embodiments relate generally to user-input devices. More particularly, the present embodiments relate to an adaptive input row for receiving various types of user input.

BACKGROUND

Traditionally, user input to a computer system includes a keyboard having dedicated keys or buttons. The operation of each key or button may be tied to a particular function or command. However, traditional keyboard systems lack the flexibility to accommodate expansive features offered by newer devices, operating systems, and software. A traditional keyboard may include some keys that may be used to perform multiple or alternative functions by pressing the key at the same time as a "shift" or "function" button. However, such configurations provide limited flexibility and can be awkward or non-intuitive for a user to operate.

SUMMARY

Some example embodiments are directed to an electronic device having an adaptive input row. The device may include a housing that defines an opening and an adaptive input row that is positioned within the opening. The adaptive input row may include a cover for receiving a touch, and a display positioned below the cover and configured to present an adaptable set of indicia. The adaptive input row may also include a touch sensor configured to detect the location of the touch, and a force sensor configured to detect a magnitude of a force of the touch. The device may also include a set of keys positioned proximate to the adaptive input row. In some embodiments, the adaptive input row is positioned adjacent to a number row of the set of keys.

In some embodiments, the device may also include a processing unit positioned within the housing, and a primary display positioned at least partially within the housing and configured to display a graphical-user interface executed by the processing unit. In some embodiments, the display is an organic light-emitting diode display. The electronic device may be a keyboard device.

In some embodiments, multiple user-input regions are defined along a length of the cover. A first user-input region of the multiple user-input regions may be responsive to the touch in a first input mode, and may not be responsive to the touch in a second input mode.

In some embodiments, the force sensor is positioned below the display. The force sensor may include a pair of capacitive electrodes separated by a compressible layer. In some embodiments, the force sensor is configured to provide a seal to prevent an ingress of moisture or liquid into an internal volume of the adaptive input row. In some embodiments, the pair of capacitive electrodes is a first pair of capacitive electrodes disposed at a first end of the display. The adaptive input row may also include a second pair of capacitive electrodes disposed at a second end of the display. In some embodiments, the electronic device further comprises sensor circuitry operatively coupled to the first and second pairs of capacitive electrodes. The sensor circuitry may be configured to output a signal that corresponds to a location of the touch on the cover based on a relative amount of deflection between the first and second pairs of capacitive electrodes.

In some embodiments, the force sensor is positioned below the display. The force sensor may include an array of force-sensitive structures arranged along a length of the adaptive input row.

Some example embodiments are directed to a user input device that includes a set of alpha-numeric keys, and an adaptive input row positioned adjacent the set of alpha-numeric keys. The adaptive input row may include a cover, a display positioned below the cover, and a sensor configured to detect a location of a touch on the cover. The display may be configured to display a first set of indicia when the device is operated in a first output mode. Touch output from the sensor may be interpreted as a first set of commands when in the first input mode. The display may be configured to display a second set of indicia when the device is operated in a second output mode. Touch output from the sensor may be interpreted as a second set of commands when in the second input mode. In some embodiments, the adaptive input row includes a touch-sensitive region that extends beyond a display region positioned over the display.

In some embodiments, a set of programmably defined regions is defined along a length of the adaptive input row. The first and second sets of indicia may be displayed over the same set of programmably defined regions. In some embodiments, the first set of indicia includes an animated indicia that is responsive to the touch on the cover.

In some embodiments, the touch on the cover includes a touch gesture input in which the touch is moved across at least a portion of the cover. The touch may also include a forceful touch input in which the touch exerts a force that exceeds a threshold. The touch may also include a multi-touch input in which multiple touches contact the cover.

Some example embodiments are directed to an electronic device including a housing, a primary display positioned within a first opening of the housing, and a keyboard having a set of keys protruding through a set of openings in the housing. The device may also include an adaptive input row positioned within a second opening of the housing adjacent to the set of keys. The adaptive input row may include a cover forming a portion of an exterior surface of the electronic device and a display positioned below the cover. The adaptive input row may also include a sensor configured to detect a touch within a programmably defined region on the cover.

In some embodiments, the sensor comprises a capacitive touch sensor formed from an array of capacitive nodes. The programmably defined region may include a touch-sensitive area detectable by multiple capacitive nodes. In some embodiments, the sensor comprises a capacitive touch sensor configured to detect a touch gesture on the cover. Additionally or alternatively, the sensor may include two or more force-sensitive structures that are configured to detect a location of the touch along the length of the cover and a force of the touch.

In some embodiments, the sensor comprises a force-sensitive structure that is disposed about the perimeter of the display. The force-sensitive structure may include an upper capacitive electrode, a lower capacitive electrode, and a compressible layer positioned between the upper and lower capacitive electrodes. In some embodiments, the force-sensitive structure forms a protective seal around the display.

In some embodiments, the electronic device further comprises a flexible conduit operatively coupled to the display and sensor. The flexible conduit may pass through a third opening in the housing located proximate to an end of the adaptive input row. The electronic device may also include a gasket positioned about the flexible conduit to form a seal between the flexible conduit and the third opening.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
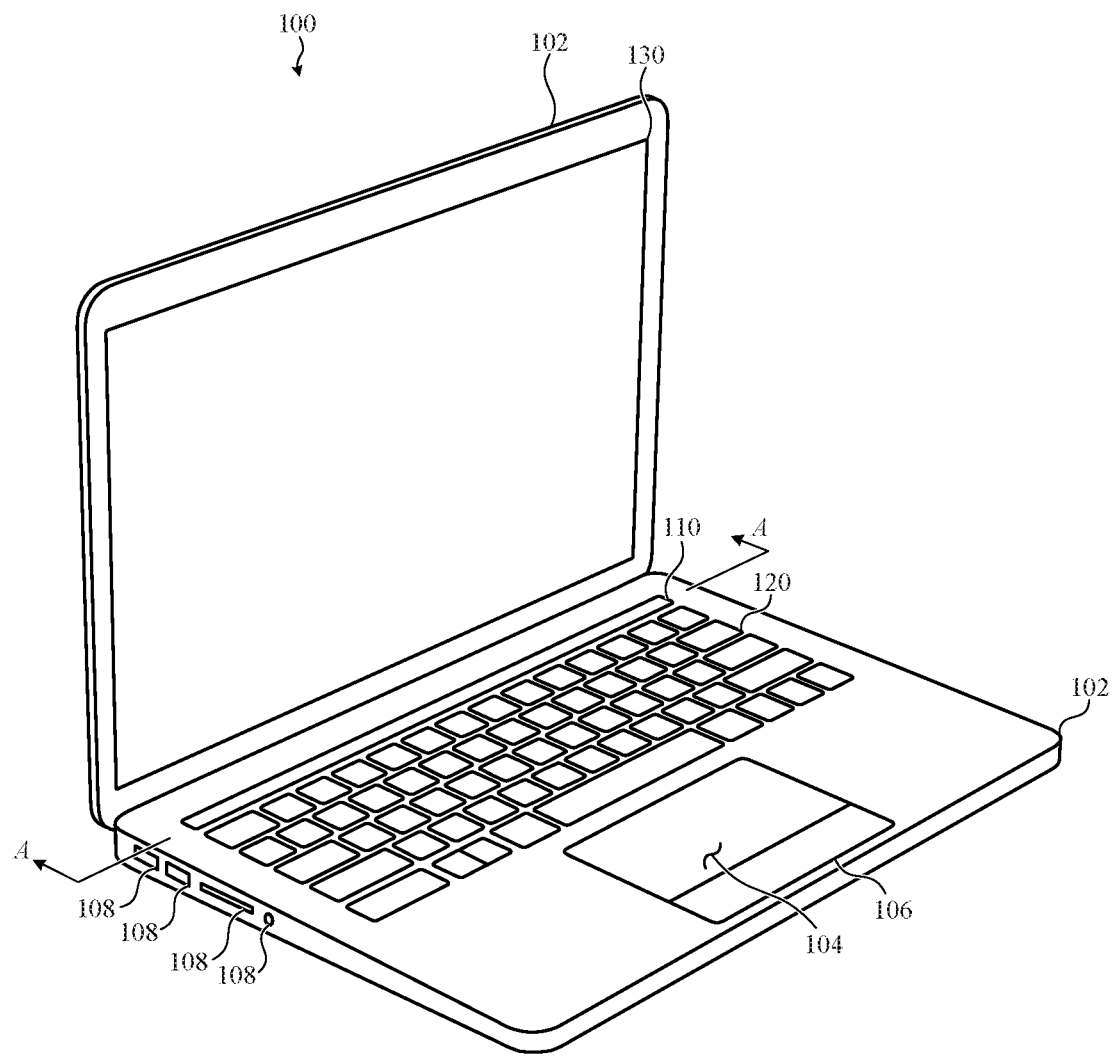
FIG. 1 depicts an example device having a keyboard and an adaptive input row.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic device having a keyboard or similar user-input device that includes an adaptive input row. The adaptive input row may include a display used to present a set of indicia or visual cues that correspond to a set of adaptive commands or functions. The adaptive input row may be responsive to a user touch, allowing selection of one or more of the set of adaptive commands or functions. The adaptive input row may be positioned above the set of alpha-numeric keys in the place of a traditional function row on a keyboard. In some cases, the adaptive input row can be used to perform the same functionality as a traditional function row, as well as perform an expanded and diverse set of commands and functions as described herein.

Some example embodiments are directed to an adaptive input row having a display that is configured to produce an adaptable set of visual indicia that correspond to an input mode of the adaptive input row. The indicia on the display may correspond to one or more of the following: a hardware-dependent input mode used to control one or more devices or hardware elements; a software-dependent input mode used to control one or more aspects of a software program being executed on the device; a user-defined mode that is configurable by the user; and other input mode examples which are described herein. The display may be used to present a set of static indicia, one or more animated indicia, or a combination of static and animated indicia.

The display may be integrated with one or more touch sensors and/or force sensors that are configured to detect various combinations of user touch and force input on the surface of the adaptive input row. The touch and/or force sensors may provide a touch-sensitive surface that is configured to detect the location of a touch, a magnitude of a touch, and/or a movement of the touch along the adaptive input row. The touch and/or force sensors may be used in combination or together to interpret a broad range of user touch configurations, including touch gestures, multi-touch input, and variable force input.

Some example embodiments are directed to an input row stack that includes a display positioned below a cover. The input row stack may also include one or both of a touch sensor and a force sensor. The touch and/or force sensor may be used to determine the position of a touch along the length of the row. In some implementations, the input row includes a touch-sensitive region that extends beyond a display region. The extended region may be used to perform dedicated functions or operations.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 depicts an example device having an adaptive input row. In the present embodiment, the device 100 is a notebook computing device that includes an adaptive input row 110, keyboard 120 and a primary display 130 all positioned at least partially within a housing 102. Other example devices may include a desktop computing system, a standalone keyboard, a tablet computing system, and so on. Additional example devices are described below with respect to FIGS. 6 and 7. Example internal components of the device 100 are described below with respect to FIG. 8.

As shown in FIG. 1, the device 100 includes an adaptive input row 110 positioned along a surface of a housing 102 above the keyboard 120. In the present example, the adaptive input row 110 is positioned adjacent to the portion of the keyboard 120 that typically includes a row of number keys. This position of the adaptive input row 110 can also be described as being along a side of the keyboard 120 that is opposite to the user. In some cases, the adaptive input row 110 is positioned in the location ordinarily occupied by the function row of a traditional keyboard. However, the position and arrangement of the adaptive input row 110 may vary in different embodiments. For example, the adaptive input row may be positioned along the side of the keyboard 120, adjacent to a bottom of the keyboard 120, or located in another region of the device 100 that is not proximate to the keyboard 120.

The adaptive input row 110 may have a color and/or finish that matches the color and/or finish of the housing 102. For example, the adaptive input row 110 may be painted or otherwise treated to match the color and appearance of an aluminum or plastic housing 102. In some embodiments, a border region is formed around the perimeter of the adaptive input row 110 that is configured to substantially match the appearance of the housing 102, while a central portion of the adaptive input row 110 is transparent to facilitate the presentation of graphics and symbols.

The adaptive input row 110 may be configured to operate as a single-dimensional, touch-sensitive surface. For example, the adaptive input row 110 may be touch-sensitive and include either or both of a touch sensor or a force sensor that is configured to determine the location of a touch along the length of the adaptive input row 110. As described in more detail below with respect to FIGS. 2A-2F, the adaptive input row 110 may be configured to receive a wide variety of touch and/or force inputs, which may be used to interpret a diverse set of commands or operations. In this example, the adaptive input row 110 has a width that is approximately the same as the width of the keys of the keyboard 120. While the adaptive input row 110 may be sized to accept an object of approximately the width of a fingertip, the adaptive input row 110 may be configured to recognize some small movements in directions that are transverse to the length of the adaptive input row 110.

The adaptive input row 110 may include an adaptable display and be configured to receive touch input from the user. The adaptable display may be a self-illuminated or illuminated display that is configured to present different sets of visual indicia depending on the input mode of the adaptive input row 110. The visual indicia may correspond to a function or command, which may also change depending on the input mode. Thus, touch selection of the same region of the adaptive input row 110 may initiate or trigger a wide variety of functions or commands. Several non-limiting example scenarios are described below with respect to FIGS. 2A-2F. Various example adaptive input row stack-ups are also provided below with respect to FIGS. 3, 4A-4F, 5A-5B, and 6A-6C.

In the example of FIG. 1, the device 100 includes a housing 102. The housing may include an upper portion 102a pivotally coupled to a lower portion 102b. The pivotal coupling may allow the housing 102 to move between an open position (shown in FIG. 1) and a closed position. In the open position, the user can access the keyboard 120 and view the primary display 130. In the closed position, the upper portion 102a may be folded to come into contact with the lower portion 102b to hide or protect the keyboard 120 and the primary display 130. In some implementations, the upper portion 102a is detachable from the lower portion 102b.

As shown in FIG. 1, the device 100 includes a keyboard 120 positioned at least partially within the lower portion 102b of the housing 102. In some embodiments, the lower portion 102b includes a web portion that includes multiple openings through which each of the keys of the keyboard 120 protrude. In some embodiments, the keyboard 120 is positioned within a single large opening in the lower portion 102b. In one example, each of the keys is an electromechanical switch that is electrically actuated when a user depresses a key mechanism past an actuation point or threshold. The keys of the keyboard may be actuated by making an electrical contact between two elements, although, in some embodiments, an optical signal, magnetic signal, or other type of actuation may be used.

The device 100 includes a primary display 130 that is positioned at least partially within an opening of the upper portion 102a of the housing 102. The primary display 130 may be operatively coupled to one or more processing units of the device 100 and used to display a graphical-user interface being generated using the one or more processing units. In some embodiments, the primary display 130 functions as the main monitor for a computing operating system to display the main graphical output for the device 100. The primary display 130 may also be used to display the user interface associated with one or more programs executed on the processing units of the device 100. For example, the primary display 130 may display a word processing user interface, a spreadsheet user interface, a web browsing user interface, and so on.

The device 100 may also include various other components or devices depicted or not depicted in FIG. 1. In particular, the device 100 may include a track pad 104 for receiving touch input from a user. The track pad 104 may be positioned along a surface of the lower portion 102b along a side of the keyboard 120 opposite to the adaptive input row 110. The track pad 104 may be used to control or guide a cursor or pointer displayed on the primary display 130. The track pad 104 may also be used to control the location of a caret in a word processing user interface, the location of an active cell in a spreadsheet user interface, or select text in a web browser user interface.

Below the track pad 104, the device may include one or more selection buttons 106. The selection button 106 may be used to select items or objects displayed on the primary display 130. The selection button 106 may be used, for example, to select an item displayed under or proximate to the cursor or pointer controlled by the track pad 104. In some cases, the selection button 106 is an electromechanical button that is actuated by depressing the selection button 106 past a threshold position. The selection button 106 may also be an electronic button that is actuated by pressing a region with a force that is greater than a threshold or actuation force. In such cases, the selection button 106 may not actually displace a perceptible amount when actuated.

The device 100 also includes one or more ports 108 or electrical connectors positioned along one or more sides of the housing 102. The ports 108 may include, for example, a USB connection port, an IEEE 1394 data port, audio connection port, video connection port, or other electrical hardware port that is configured to transmit and/or receive signals or data. The ports 108 may also include a power connection port that is configured to receive electrical power from an external source such as a wall outlet or other power source.

In general, the adaptive input row may provide an expandable or adaptable user input for the device. In particular, an adaptive input row having a display, a touch sensor and/or a force sensor may be configured to receive user input for a wide range of scenarios. FIGS. 2A-2F depict example embodiments of an adaptive input row and how it may be used to interpret a wide variety of user input.

Figure 2A:
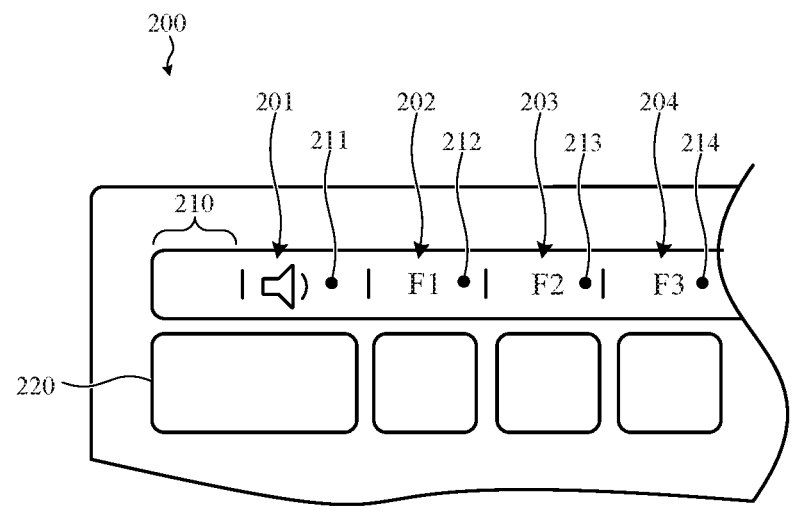
FIGS. 2A-2J depict example embodiments for uses of an adaptive input row.

FIG. 2A depicts an example partial view of an adaptive input row 200 positioned above or adjacent a set of keys 220 of a keyboard. In this example, the adaptive input row 200 is displaying a set of indicia 201-204 that corresponds to various functions or operations. The set of indicia 201-204 may be displayed in accordance with a first input mode, such as a function-row input mode. The function-row input mode may, for example, be the default or initial input mode of the adaptive input row 200.

The adaptive input row 200 may include a set of programmably defined regions 211-214, each associated with a respective indicium of the set of indicia 201-204. Each region 211-214 may be defined as the area above and immediately surrounding a respective indicium 201-204. In this example, each region 211-214 is defined as a substantially rectangular region that abuts an adjacent region along the length of the adaptive input row 200. The approximate border between the regions is indicated by a short line segment, as shown in FIG. 2A. However, it is not necessary that the borders of the regions 211-214 be visually marked or designated. It is also not necessary that the regions 211-214 be rectangular in shape or be directly abutting each other. For example, in some embodiments, the regions 211-214 may be oval or rounded in shape and be separated by a small gap or region that is not associated with an indicium.

As shown in FIG. 2A, the adaptive input row 200 includes a touch-sensitive region 210 that is not associated with a respective indicium. In some embodiments, the touch-sensitive region 210 may not include any display or illumination capacity. While the adaptive input row 200 may not display an indicium or symbol, the touch-sensitive region 210 may still be associated with one or more functions or operations. For example, the touch-sensitive region 210 may be operable, when touched, to perform an "illuminate" function that causes the other indicia 201-204 of the adaptive input row 200 to become illuminated. Similarly, the touch-sensitive region 210 may be operable, when touched, to change the indicia or graphical output on other programmably defined regions 211-214 of the adaptive input row 200. For example, in response to a touch within the touch-sensitive region 210, the adaptive input row 200 may be configured to change the set of indicia 201-204 from a first set indicia to a second, different set of indicia. In some cases, the touch-sensitive region 210 may be operable to change between different input modes of the adaptive input row 200. The touch-sensitive region 210 may also be operable to perform a "wake" function that activates the adaptive input row 200, the keyboard, and/or the device. In some embodiments, the touch-sensitive region 210 is at least partially illuminated by a backlight to provide a glow or other visual indicator. In some embodiments, the touch-sensitive region 210 includes one or more indelible markings, such as a printed border, symbol, or shaded region.

The indicia that are displayed and the respective regions may vary depending on the input mode of the adaptive input row 200. In the example input mode of FIG. 2A, the set of indicia may include a set of function icons 202 ("F1"), 203 ("F2"), and 204 ("F3"). The function icons 202-204 may correspond to functionality traditionally associated with the function-number keys (e.g., F1 through F12) on a traditional keyboard. The functionality assigned to these icons 202-204 may be defined by the operating system or other software running on the device. A user may initiate or execute the assigned functionality by touching the respective region 212-214 associated with one of the function icons 202-204.

As shown in FIG. 2A, the adaptive input row 200 may also display an indicium 201 that, in this example, is depicted as a volume icon. The indicium may correspond to the volume control of a speaker contained within or controlled by the device. A touch on the region 211 corresponding to the indicium 201 may initiate a volume control function or operation.

Figure 2B:
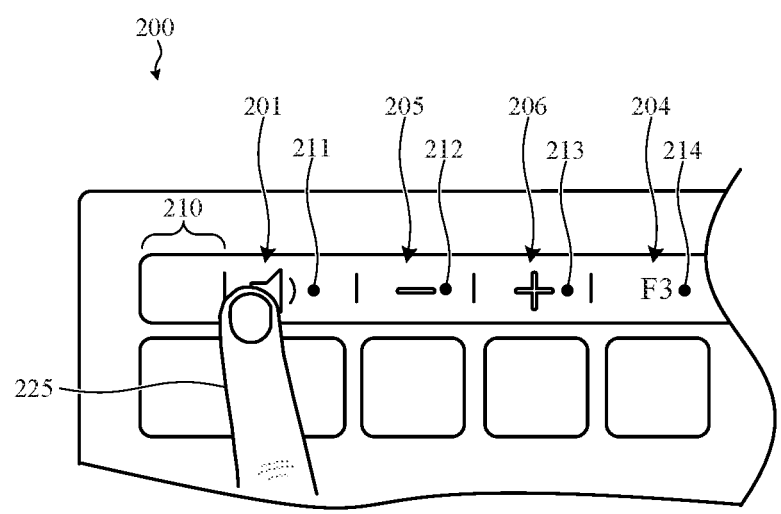

In particular, FIG. 2B depicts another (second) input mode that may be invoked in response to, for example, the touch of an object 225 (e.g., a finger) on the region 211. In the second input mode depicted in FIG. 2B, the programmably defined regions 211-214 remain in the same location and a different set of indicia 201, 205, 206, and 204 are displayed. The set of indicia associated with the second input mode may include both changed indicia and indicia that may stay the same. For example, the indicia 201 and 204 remain displayed in their respective regions 211 and 214. However, different indicia 205 and 206 are displayed within regions 212 and 213, respectively.

The new or changed indicia may correspond to the user selection, which in this example may be interpreted as a request to control speaker hardware settings (e.g., volume control). Accordingly, the indicia 205 and 206 are associated with hardware control functionality, specifically, volume down ("−") and volume up ("+") speaker controls. While these are provided as example hardware control features, other icon arrangements or functionality may also be provided.

With respect to the example second input mode of FIG. 2B, the touch-sensitive region 210 may remain associated with the same function or operation assigned with the input mode of FIG. 2A. That is, the touch-sensitive region 210 may be assigned an "illuminate," "wake," or other similar operation and may be illuminated. Alternatively, the touch-sensitive region 210 may become un-illuminated or darkened in accordance with the second input mode due to the adaptive input row 200 being in a currently active state.

Figure 2C:
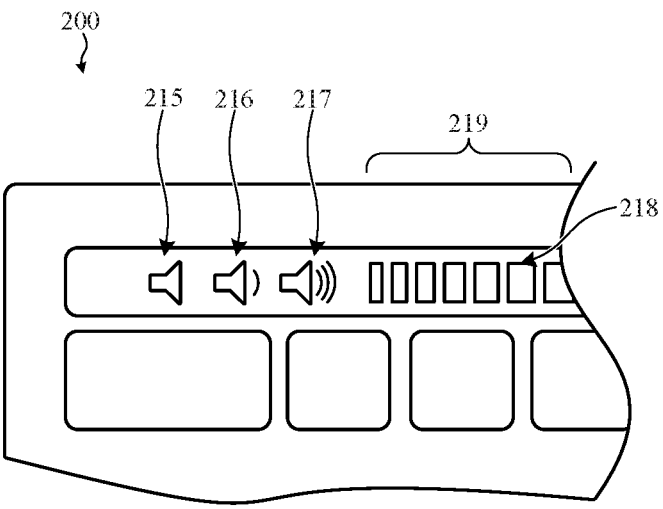

FIG. 2C depicts another example (third) input mode that may be invoked in response to a user selection or other triggering event. As shown in FIG. 2C, another (third) set of indicia may be displayed in accordance with the third input mode. Specifically, a first indicium 215 may include a mute/unmute symbol, a second indicium 216 may include a volume down symbol, and a third indicium 217 may include a volume up symbol. A touch on each of the regions associated with indicia 215-217 may be interpreted as a command to perform the corresponding function (e.g., mute/unmute, decrease volume, increase volume).

The third input mode depicted in FIG. 2C also includes a fourth indicium 218, which may include a graduated indicator symbol. The fourth indicium 218 may be displayed within a corresponding region 219 that is configured to receive a touch gesture input. For example, a sliding touch to the left or right within region 219 may result in a corresponding volume adjustment, either up or down, depending on the direction of the sliding touch. Thus, the adaptive input row 200 may be used to provide a variable level of control that corresponds to or is scaled with respect to an amount of movement of a gesture or other touch input.

Figure 2D:
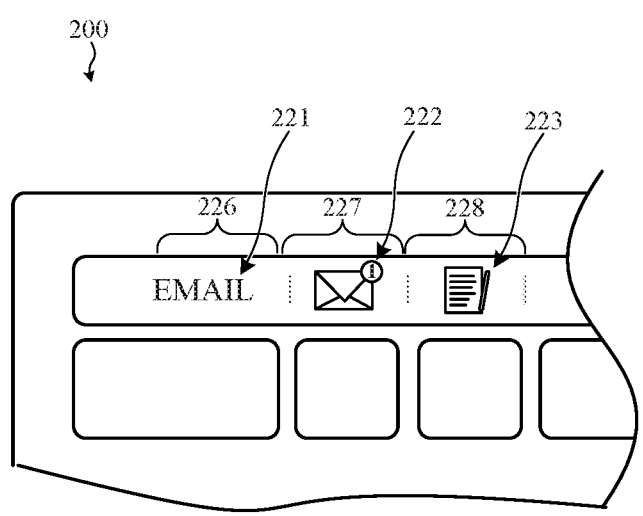

FIG. 2D depicts another example input mode including a set of indicia 221, 222, 223 that is associated with an application software functionality and/or user interface. In the present example, the input mode of FIG. 2D is associated with an e-mail application software program that may be currently being executed on the device. The indicium 222 may include an envelope having a number indicating a number of unread e-mails. A user selection on the region 227, corresponding to indicium 222, may be interpreted as a request to read new or recent e-mail messages. Accordingly, the device may display a user interface having new or recent e-mail messages, in response to a touch selection on region 227. The indicium 223 may include a sheet of paper and pencil representing a command to open a new e-mail. Accordingly, a user selection on region 228, corresponding to indicium 223, may result in a new e-mail being opened and displayed on the primary display of the device (130 of FIG. 1). The example of FIG. 2D also includes indicium 221, which may indicate the type of application software ("EMAIL") associated with the current input mode of the adaptive input row 200.

In some implementations of the input mode of FIG. 2D, some of the regions may be active or touch-sensitive and other regions may be inactive. For example, regions 227 and 228 may be active or touch-sensitive in accordance with the description provided above. That is, a touch on either region 227 or region 228 may result in a command or function being executed or performed. In contrast, region 226 may be inactive in the present input mode. That is, a touch on region 221 may not result in a command or function being executed or performed. Because the regions of an input mode are programmably defined, nearly any portion of the adaptive input row may be selectively designated as either active or inactive in accordance with the input mode.

Figure 2E:
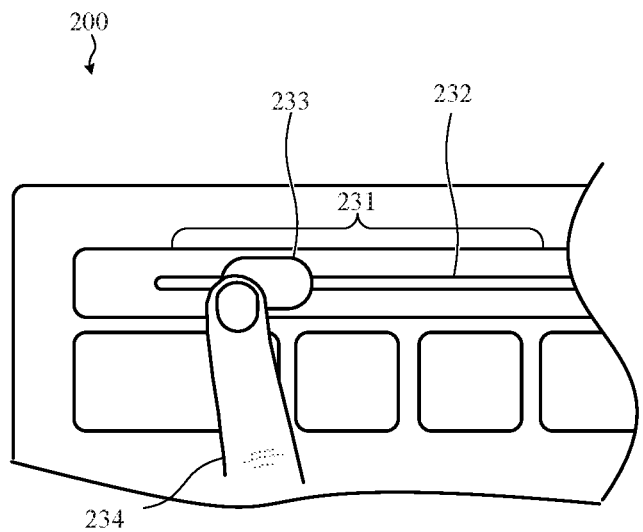

FIG. 2E depicts another example input mode that may be implemented using the adaptive input row 200. The example input mode may include the display of an indicium 232 that may be animated or modified in accordance with a movement of an object 234 (e.g., a finger) across the adaptive input row 200. Specifically, the adaptive input row 200 includes a slider having a slider node 233 that may be translated along the length of the adaptive input row 200 in accordance with the movement of the touch of the object 234. In the present example, a sliding gesture across the adaptive input row 200 results in an animated indicium 232 having a slider node 233 that follows or tracks the movement of the object 234.

FIG. 2E provides another example in which a gesture input over a region 231 may be provided to the adaptive input row 200 to provide a variable or scaled operation. The slider-type indicium 232 of FIG. 2E may be used to control a scalable or variable operation, such as a horizontal scroll across a document or user interface. In this case, the amount of scrolling may correspond to an amount of movement of the object 234.

Figure 2F:
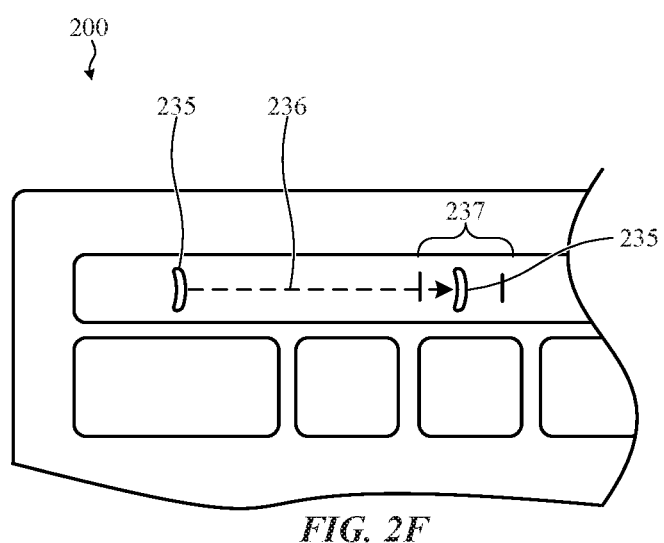

FIG. 2F depicts another example input mode using the adaptive input row 200. The example input mode may include an indicium 235 that is animated to prompt or guide the user. In this example, the indicium 235 is a crescent that is animated in motion along path 236 from left to right across the adaptive input row 200. The animated crescent 235 may prompt or guide the user to region 237, which may be a touch-sensitive or activated region on the adaptive input row 200.

FIGS. 2G-2J depict various example types of touch input that may be provided to the adaptive input row. In general, the touch input may include one or more types of touch interactions including, for example, a touch, a forceful touch, a gesture, or any combination thereof.

Figure 2G:
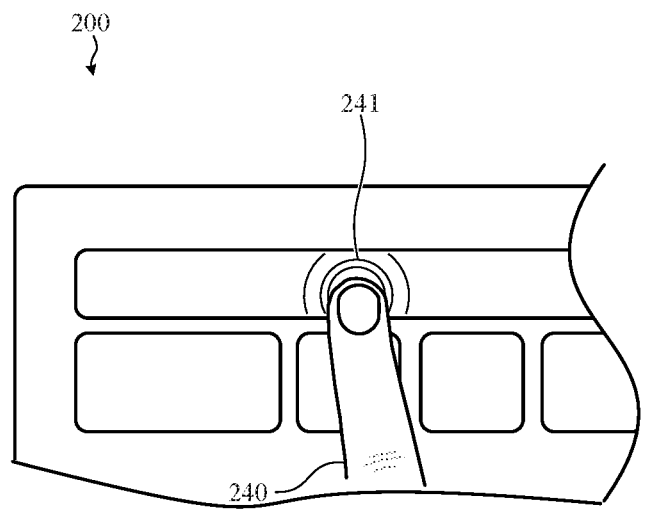

As shown in FIG. 2G, the adaptive input row 200 may be configured to receive and detect the force of a touch provided by an object 240 (e.g., a finger) placed in contact with the adaptive input row 200. As described in more detail below with respect to FIGS. 3, 4A-4F, 5A-5B, and 6A-6C, the adaptive input row 200 may include a force sensor that is configured to detect an amount of force applied to the adaptive input row 200. In some embodiments, the force sensor of the adaptive input row 200 may be used to detect whether an applied force exceeds a threshold in order to distinguish between a light touch and a forceful touch. In many embodiments, the output of the force sensor is non-binary and corresponds to the amount or degree of force applied. Thus, more than one threshold may be used to define multiple levels of input force. Additionally, the force sensor may be used to generate a continuously varying signal that corresponds to the amount of force applied to the adaptive input row 200, which may be used to control a variable or scalable function or operation.

In some embodiments, a visual response 241 is produced by the adaptive input row 200 in response to a touch or a force being applied by the object 240. The visual response 241 may, in some cases, include an animation or other visual effect. For example, the visual response 241 may include a ripple or wave animation in response to a touch by the object 240. In some implementations, the visual response 241 may include an animation (e.g., a wave or ripple) indicating that the force of the touch has exceeded a threshold. A touch having a force that exceeds a threshold may be used to invoke alternative or secondary functionality along the adaptive input row 200. Additionally or alternatively, the force of a touch may be used to provide a variable or scaled input to a function or operation. For example, an amount of scrolling or the size of a selection may be controlled, in part, by modulating the amount of force applied to the adaptive input row 200.

Additionally or alternatively, the adaptive input row 200 may be configured to produce a haptic response in response to a touch or applied force. For example, the adaptive input row 200 may include or be operatively coupled to a vibratory motor or other haptic device that is configured to produce a localized haptic output over a portion of the adaptive input row 200. The localized haptic output may include an impulse or vibratory response that is perceptible to the touch on the surface of the adaptive input row 200. The localized haptic output may be attenuated or damped for surfaces of the device other than the adaptive input row 200.

Figure 2H:
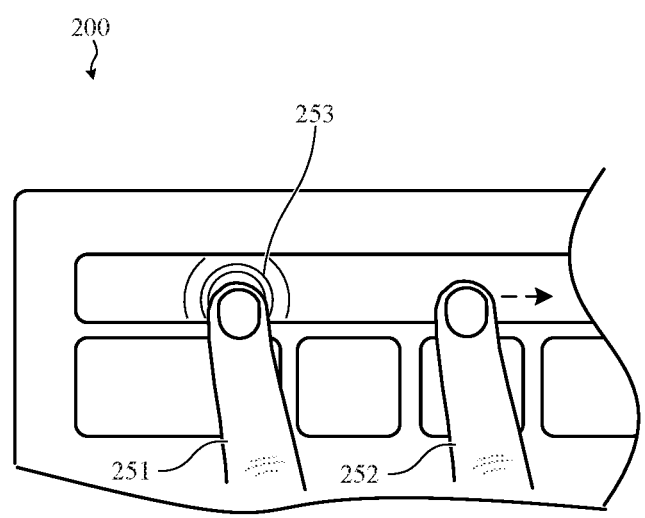

FIG. 2H depicts an example of a multi-touch input that may be received by the adaptive input row 200. In the example of FIG. 2H, a first object 251 (e.g., a first finger) may be used to apply a forceful touch while a second object 252 (e.g., a second finger) may be used to touch and/or perform a gesture. The configuration depicted in FIG. 2H may be used to perform one of multiple types of touch input. For example, the forceful touch of the first object 251 may be used to invoke a secondary command, such as a document scroll command. While maintaining the forceful touch, as indicated by the visual response 253, a gesture may be performed using the second object 252 which may be used as a variable input to the scroll command. For example, the amount of movement across the row provided by the second object 252 may correspond to an amount of scrolling that is performed.

Figure 2I:
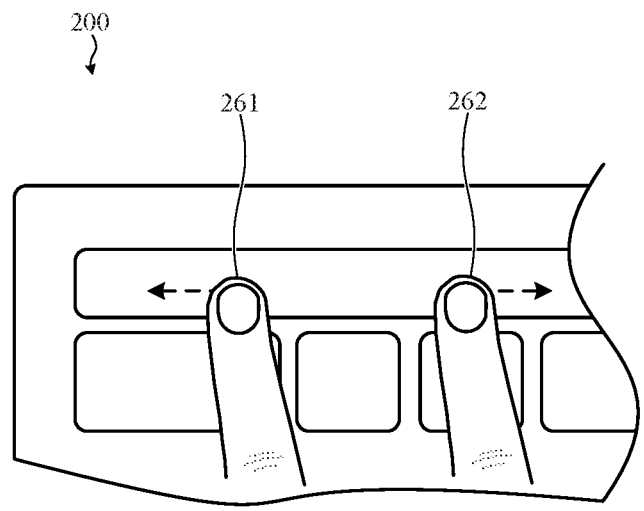

FIG. 2I depicts another example of a multi-touch input that may be received by the adaptive input row 200. As shown in FIG. 2I, a first object 261 (e.g., a first finger) and a second object 262 (e.g., a second finger) may perform a coordinated movement or gesture to invoke a command or function. In the present example, the first object 261 and second object 262 may be moved away from each other in opposite directions. This multi-touch gesture may invoke a zoom-in or enlarge command for an object or image displayed using the primary display of the device. Similarly, the first object 261 and second object 262 may be moved toward each other in opposite directions to invoke a zoom-out or reduce command.

Figure 2J:
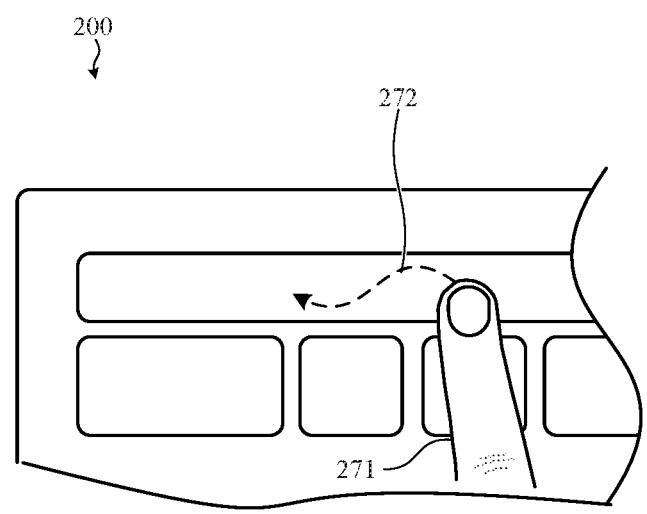

FIG. 2J depicts an example of a two-dimensional gesture that may be received by the adaptive input row 200. In general, due to the long narrow shape of the touch-sensitive surface, adaptive input row 200 may be well-suited to detect single-dimensional (e.g., length-wise) touch location information. However, as shown in FIG. 2J, the adaptive input row 200 may also be configured to detect a small amount of transverse movement. In the example of FIG. 2J, the adaptive input row 200 may be configured to determine the transverse (or width-wise) position of an object 271 (e.g., a finger) as it moves along a path 272. In some embodiments, the adaptive input row 200 may be configured to detect a contoured or curved gesture path 272. Additionally or alternatively, the adaptive input row 200 may be configured to detect a vertical or width-wise gesture that is performed transverse to the length of the adaptive input row 200.

The ability to determine transverse position may not be limited to gesture input. For example, in some embodiments, more than one programmably defined region may be defined along the width of the adaptive input row 200. Accordingly, the number of selectable regions may be increased by distinguishing between a touch on an upper region versus a lower region of the adaptive input row 200.

The examples of FIGS. 2A-2J are provided by way of example and are not intended to be limiting in nature. Additionally, display features of any one of the examples of FIGS. 2A-2F may be combined with any one of the example touch-input examples of FIGS. 2G-2J. Similarly, one or more features of any one example of FIGS. 2A-2J may be combined with one or more features of another example of FIGS. 2A-2J to achieve functionality or an input mode not expressly described in a single figure.

The flexible and configurable functionality described above with respect to FIGS. 2A-2J depends, in part, on the ability to programmably define various touch-sensitive regions across the adaptive input row. The programmably defined touch-sensitive regions may be enabled using one or more sensors that are integrated with the adaptive input row. The sensors may include one or both of a touch sensor and a force sensor.

Figure 3:
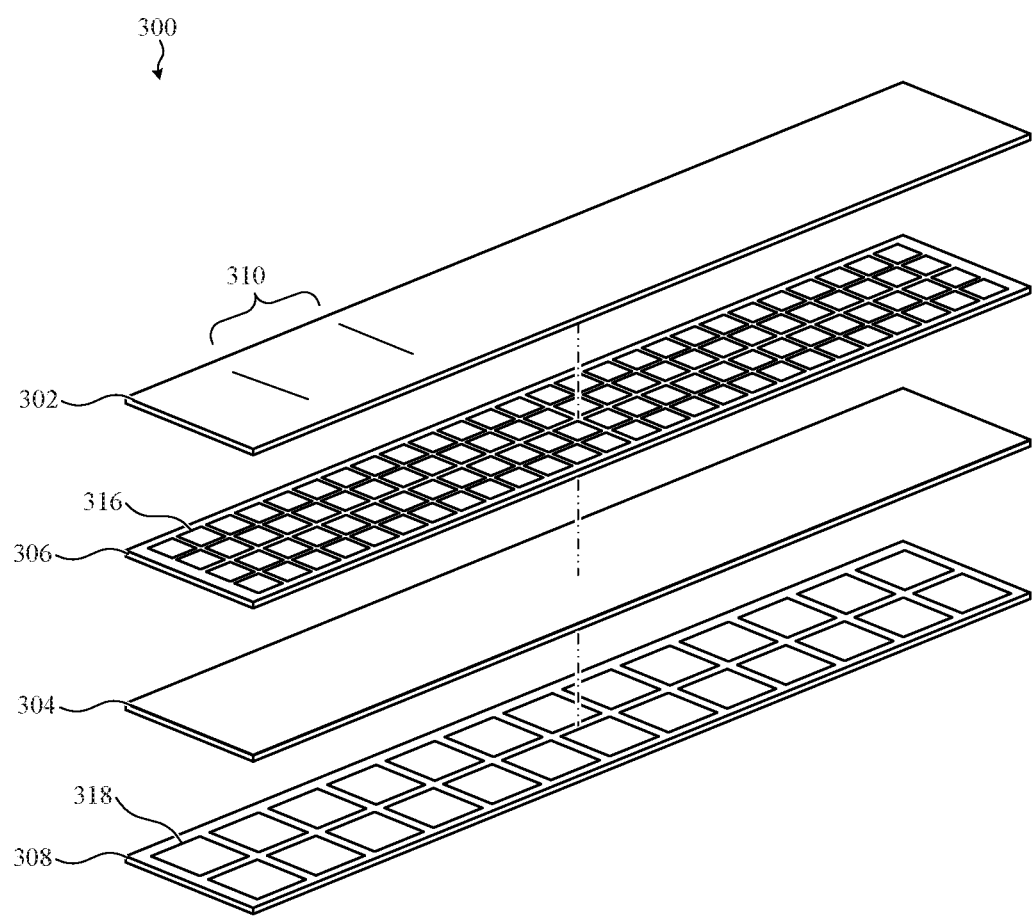
FIG. 3 depicts an exploded view of a simplified adaptive input row.

FIG. 3 depicts a simplified exploded view of an adaptive input row 300 having both a touch sensor layer 306 (or touch layer 306) and a force sensor layer 308 (or force layer 308) positioned under a cover 302. As shown in the simplified embodiment of FIG. 3, the touch layer 306 may be positioned between a display 304 and the cover 302. The force layer 308 may be positioned on a side of the display 304 opposite to the touch layer 306. However, the relative position of the various layers may change depending on the embodiment.

In the simplified exploded view of FIG. 3, the layers are depicted as having approximately the same length. However, in some embodiments, the length of the layers may vary within the stack. For example, the cover 302 and touch layer 306 may be longer than the display 304 and the force layer 308. In some cases, the cover 302 and the touch layer 306 may be extended to define a touch-sensitive region that is not illuminated by the display 304.

As shown in FIG. 3, the touch sensor layer 306 includes an array of sensing nodes 316 that is configured to detect the location of a finger or object on the cover 302. The array of sensing nodes 316 may operate in accordance with a number of different touch sensing schemes. In some implementations, the touch layer 306 may operate in accordance with a mutual-capacitance sensing scheme. Under this scheme, the touch layer 306 may include two layers of intersecting transparent traces that are configured to detect the location of a touch by monitoring a change in capacitive or charge coupling between pairs of intersecting traces. In another implementation, the touch layer 306 may operate in accordance with a self-capacitive sensing scheme. Under this scheme, the touch layer 306 may include an array of capacitive electrodes or pads that is configured to detect the location of a touch by monitoring a change in self-capacitance of a small field generated by each electrode. In other implementations, a resistive, inductive, or other sensing scheme could also be used.

In general, the density or size of the sensing nodes 316 of the touch layer 306 is greater than the size of a typical programmably defined region 310, which may be sized to receive the touch of a single finger. In some cases, a group of multiple sensing nodes 316 are used to logically define the programmably defined region 310. Thus, in some embodiments, multiple sensing nodes 316 may be used to detect the location of a single finger.

The sensing nodes 316 may be formed by depositing or otherwise fixing a transparent conductive material to a substrate material. Potential substrate materials include, for example, glass or transparent polymers like polyethylene terephthalate (PET) or cyclo-olefin polymer (COP). Example transparent conductive materials include polyethyleneioxythiophene (PEDOT), indium tin oxide (ITO), carbon nanotubes, graphene, piezoresistive semiconductor materials, piezoresistive metal materials, silver nanowire, other metallic nanowires, and the like. The transparent conductors may be applied as a film or may be patterned into an array on the surface of the substrate using a printing, sputtering, or other deposition technique.

In some embodiments, the touch layer 306 is formed directly on the cover 302. Before forming the touch layer 306, the cover 302 may be strengthened using an ion-exchange or other strengthening treatment process. The touch layer 306 may be formed directly onto the cover 302 using, for example, a stereo lithographic process or other similar technique for forming multiple conductive layers on a substrate. The strengthening and sense-layer-forming processes may be performed on a sheet of material that is larger than the final shape of the cover 302. Thus, after forming the touch layer 306, in some instances, the final shape of the cover 302 may be cut from the larger sheet of material. The cover 302 may then be edge ground and otherwise prepared for assembly with other components of the adaptive input row 300.

As shown in FIG. 3, the adaptive input row 300 may also include a force layer 308 positioned, in this case, under the display 304. The force layer 308 may include an array of force nodes 318 which may be used to estimate the magnitude of force applied by one or multiple touches on the cover 302. Similar to the touch layer 306, the force layer 308 may include an array of force-sensing structures or force nodes 318, which may operate in accordance with various force-sensing principles.

In some embodiments, the force nodes 318 are formed from a strain-sensitive material, such as a piezoresistive, piezoelectric, or similar material having an electrical property that changes in response to stress, strain, and/or deflection. Example strain-sensitive materials include carbon nanotube materials, graphene-based materials, piezoresistive semiconductors, piezoresistive metals, metal nanowire material, and the like. Each force node 318 may be formed from an individual block of strain-sensitive material that is electrically coupled to sensing circuitry. Alternatively, each force node 318 may be formed from an electrode pair that is positioned on opposite sides or ends of a sheet of a strain-sensitive sheet.

In some embodiments, the force nodes 318 are formed from a capacitive force-sensitive structure that includes at least two capacitive plates separated by a compliant or compressible layer. The force of a touch may cause the partial compression or deflection of the compressible layer and may cause the two capacitive plates to move closer together, which may be measured as a change in capacitance using sensing circuitry operatively coupled to each of the force nodes 318. The change in capacitance, which corresponds to an amount of compression or deflection of the compressible layer, may be correlated to an estimated (applied) force.

Alternatively, the force nodes 318 may operate in accordance with an optical or resistive sensing principle, For example, an applied force may cause a compression of a compliant or compressible layer which may be detected using an optical sensor. In some embodiments, compression of the compressible layer may result in contact between two or more layers, which may detected by measuring the continuity or resistance between the layers.

The arrangement and density of the force nodes 318 may vary depending on the implementation. For example, if it not necessary to resolve the force for each of multiple touches on the adaptive input row 300, the force layer 308 may comprise a single force node 318. However, in order to estimate the magnitude of force of each of multiple touches on the cover 302, multiple force nodes 318 may be used. The density and size of the force nodes 318 will depend on the desired force-sensing resolution. Additionally or alternatively, the force layer 308 may be used to determine both the location and the force applied to the adaptive input row 300. In this case the size and placement of the force nodes 318 may depend on the mechanical principle used to determine the location of the touch. Example force layer embodiments that may be used to detect location as well as forces are described in more detail below with respect to FIGS. 5A-5B.

In some embodiments, the touch layer 306 and the force layer 308 may be formed on a single, shared layer. For example the sensing nodes 316 and the force nodes 318 may be interspersed with each other. The combined touch and force layer may be positioned between the display 304 and the cover 302 or, alternatively, may be positioned below the display 304 on a side opposite to the cover 302.

In some embodiments, one or more additional layers may be incorporated into the adaptive input row 300. For example, the additional layer may include a haptic layer having one or more mechanisms for producing a localized haptic response on the surface of the cover 302. In some instances, a haptic layer may include a piezoelectric transducer or other mechanism that is configured to produce a vibration or impulse that is perceptible to the touch of a finger on the surface of the cover 302. In some embodiments, the haptic layer may include one or more strips of piezoelectric material that are configured to displace the cover 302 in response to an electrical stimulus or signal.

As described above with respect to FIG. 1, an adaptive input row may be integrated with or positioned in an opening in the housing of a device. FIGS. 4A-4F depict cross-sectional views taken across section A-A of FIG. 1 and illustrate various example component stackups for an adaptive input row 400. While various components are depicted as being located in a particular position, the relative placement of some components may vary depending on the embodiment. Additionally, some components, including intermediate substrates, adhesive layers, and various other layers have been omitted from FIGS. 4A-4F for clarity. In general, the adaptive input row examples of FIGS. 4A-4F may be used to perform one or more of the inputs or display features described above with respect to FIGS. 2A-2J.

Figure 4A:
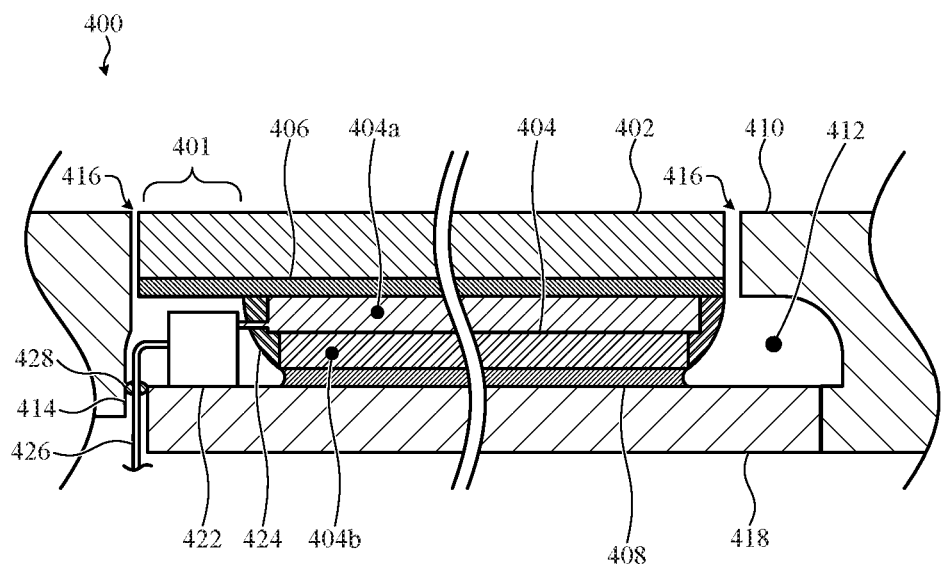
FIGS. 4A-4F depict cross-sectional views of example embodiments of an input row stackup.
Figure 4B:
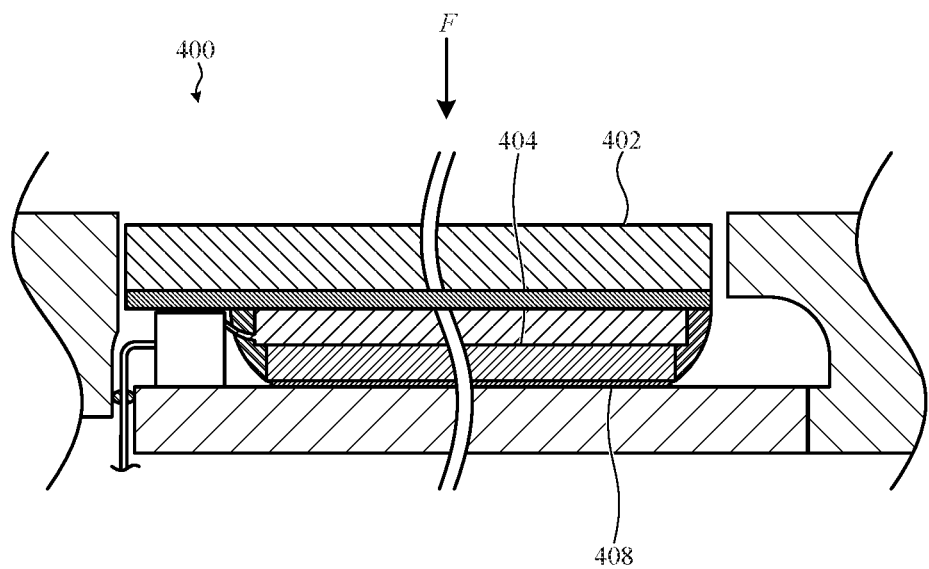

FIGS. 4A and 4B depict an example adaptive input row 400 in an un-deflected and deflected state, respectively. The adaptive input row 400 may be deflected by, for example, the force (F) of one or more touches on the surface of the cover 402. In this embodiment, the force (F) results in a partial compression or deflection of the force-sensing layer 408. Described in more detail below, the force-sensing layer 408 may be formed from a single force-sensing component or an array of force-sensing components or nodes positioned throughout the force-sensing layer 408.

The movement of various components due to the deflection of the adaptive input row 400 is exaggerated between FIGS. 4A and 4B to better illustrate various principles. However, in an actual implementation, the amount of movement or deflection may be significantly less than as depicted in the examples of FIGS. 4A and 4B. In some cases, the actual movement or deflection of the adaptive input row 400 is imperceptible or virtually imperceptible to a human touch. Furthermore, it is not necessary to deflect the adaptive input row 400 in order to actuate one or more regions of the adaptive input row 400. In particular, the adaptive input row 400 includes a touch layer 406 positioned below the cover 402 which may include a touch node array that is configured to detect light or near touches on the surface of the cover 402. Therefore, the un-deflected state of FIG. 4A may also represent an un-actuated or an actuated state, as deflection of the adaptive input row 400 is not necessary in order to recognize a touch on the cover 402 of the adaptive input row 400.

As shown in FIGS. 4A and 4B, the adaptive input row 400 is positioned in an opening 412 defined within the housing 410. In the present embodiment, the opening 412 is a recess or pocket formed in a top surface of housing 410. Accordingly, the opening 412 (with the exception of passage 414) does not expose the internal components of the device even when the adaptive input row 400 is not installed or positioned within the opening 412. This may be advantageous for sealing the device against debris or contaminants or liquid ingress. The opening 412 may be defined, at least in part, by a support structure 418, which may be integrally formed with the housing 410 or, alternatively, may be formed from a separate component.

The adaptive input row 400 includes a cover 402 having a touch-sensitive surface that forms a portion of an exterior surface of the device. The cover 402 may be formed from a durable transparent material, including various types of ceramics, such as glass, alumina, sapphire, zirconia, and the like. The cover 402 may also be formed from a polymer material, such as polycarbonate, polyethylene, acrylic, polystyrene, and the like. The upper or exterior surface of the cover 402 may be approximately aligned with the upper or exterior surface of the housing 410. In the present example, a small gap 416 is formed between the opening 412 of the housing 410 and the edge of the cover 402. The gap 416 allows for a small amount of relative movement between the cover 402 and the housing 410. The gap 416 may also form a structural relief between the components and reduce or eliminate forces applied to the housing 410 from affecting the force-sensing layer 408 of the adaptive input row 400.

As shown in FIGS. 4A and 4B, a display 404 may be positioned below the cover 402. The display 404 may be a pixelated display configured to display programmable images and graphic displays. In some embodiments, the display 404 may have a pixel spacing or pitch of 0.4 mm or less. The display 404 may also have a refresh rate of 30 Hz or greater. In the present example, the display 404 includes an organic light-emitting diode (OLED) display formed from two layers: an encapsulation layer 404a and a phosphorescent organic layer 404b. The display 404 may also include one of a variety of other types of display elements including, for example, a liquid crystal display (LCD), a light-emitting diode (LED) display, a electroluminescent (EL) display, an electrophoretic ink display, and the like.

As shown in FIGS. 4A and 4B, the display 404 and the cover 402 are nearly congruent. In particular, with the exception of touch-sensitive region 401, the area of the display 404 overlaps with the area of the cover 402. Thus, nearly the entire area of the cover 402 (with the exception of region 401) may be illuminated by the display 404. In this example, the cover 402 includes a non-display, touch-sensitive region 401 located at an end of the adaptive input row 400. The touch-sensitive region 401, as the name implies, may be configured to detect a touch and/or a force of touch but is not illuminated by the display 404. The touch-sensitive region 401 may correspond to the touch-sensitive region 210 of FIG. 2A-2B. In some embodiments, the touch-sensitive region 401 is not illuminated. Alternatively, the touch-sensitive region 401 may be illuminated by a light-emitting diode (LED) or other light-emitting element positioned under the cover 402. The light-emitting element may be integrated, for example, with circuitry 422 positioned under the touch-sensitive region 401.

A touch layer 406 may also be positioned below the cover 402. In some embodiments, the touch layer 406 is positioned on a layer disposed between the cover 402 and the display 404. As described above with respect to FIG. 3, the touch layer 406 may include an array or grid of capacitive nodes that is configured to detect the location of a touch on the surface of the cover 402. In general, the size of the capacitive node is smaller than a typical programmably defined region so that multiple capacitive nodes may be included within a single programmably defined region.

As shown in FIGS. 4A and 4B, the adaptive input row 400 also includes a force layer 408 that may be used to estimate an amount of force (F) applied to the cover 402. The force layer 408 may operate in accordance with one or more force-sensing principles, including piezoelectric, piezo-resistive, capacitive, and so on. The force layer 408 may be formed as a single force-sensing structure or may include an array or pattern of multiple force-sensing structures. While the force layer 408 is depicted as a generic block in FIGS. 4A and 4B, the force layer 408 may not cover the entire region below the display 404. Alternative example force layers are described below with respect to FIGS. 5A-5B and 6A-6C.

The examples of FIGS. 4A and 4B, the display 404, the touch layer 406, and the force layer 408 are operatively coupled to circuitry 422. To reduce signal degradation, the circuitry 422 may be located in the opening 412 formed in the housing 410. The circuitry 422 may be positioned, for example, below the non-display, touch sensitive region 401. The circuitry 422 may include signal conditioning circuitry, analog to digital conversion circuitry, and/or other signal processing circuitry. In some embodiments, the circuitry 422 may also include one or more microprocessors used to control one or more of the display 404, the touch layer 406, and the force layer 408.

The circuitry 422 may be coupled to other electronic components positioned within the housing 410 via a flexible conduit 426. The flexible conduit 426 may be used to operatively couple the circuitry 422 with internal device components including, for example, one or more processing units and computer memory. A more complete description of internal device components is provided below with respect to FIG. 8.

In this example, the flexible conduit 426 enters an internal volume of the housing 410 through the passage 414. The passage 414 may be formed as a hole or slot in the support structure 418. To prevent the ingress of liquid or other potential contaminants, a gasket or seal 428 may be disposed between the flexible conduit 426 and the passage 414. The seal 428 may be formed from a soft compliant material such as silicone or another type of elastomer. In some embodiments, the seal 428 may be over-molded directly onto the flexible conduit 426. Alternatively, the seal 428 may be formed as a separate component and slipped onto the flexible conduit 426 before it is inserted into the passage 414.

Alternatively, the circuitry 422 may be formed on or attached to the flexible conduit 426. Thus, in some cases, the circuitry 422 may pass through the passage 414 and may even be positioned within the internal volume of the housing 410. In some embodiments, the circuitry 422 may be positioned within a separate opening that is partitioned or otherwise separated from the opening 412.

The adaptive input row 400 may include other features or components that reduce potential exposure to moisture, liquid, or other contaminants. For example, the adaptive input row 400 may include a potting layer 424 formed around the edges of the display 404. In some embodiments, the potting layer 424 may also cover some or all of the force layer 408 and/or touch layer 406. In some embodiments, the potting layer 424 is formed from two or more layers having different materials and/or covering different regions of the adaptive input row 400. The potting layer 424 may be formed from an epoxy or other similar compound. The potting layer 424 may be embedded with another material such as a glass fiber to improve the strength and performance of the potting layer 424. The potting layer 424 may also be specially formulated to be less sensitive to moisture or other potential contaminants.

In some embodiments, some or all of the opening 412 may be filled with a potting or encapsulating material. For example, the region of the opening 412 surrounding the circuitry 422 may be filled with potting or encapsulating material. By encapsulating or potting the region around the circuitry 422, the electronics may be protected from moisture while also sealing the passage 414 and preventing moisture or liquid from entering the internal volume of the housing 410.

Figure 4C:
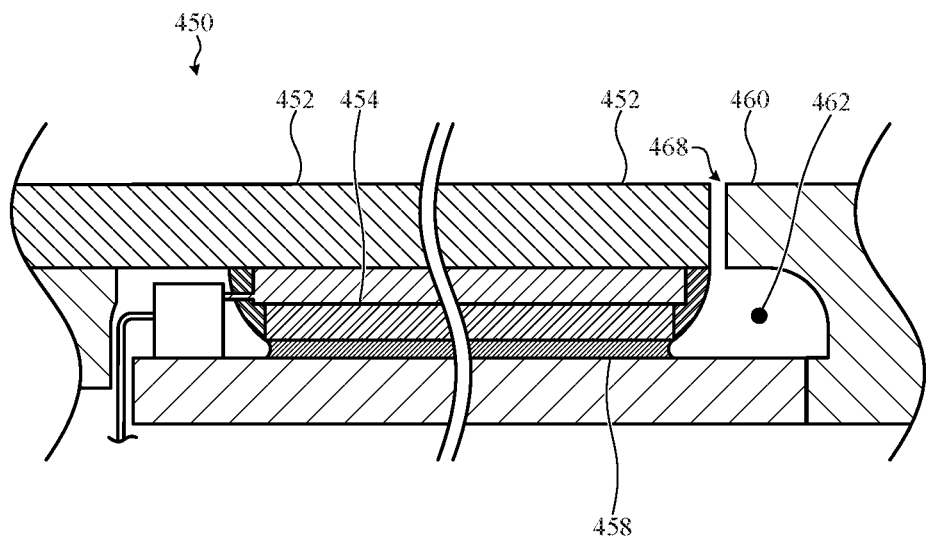
Figure 4D:
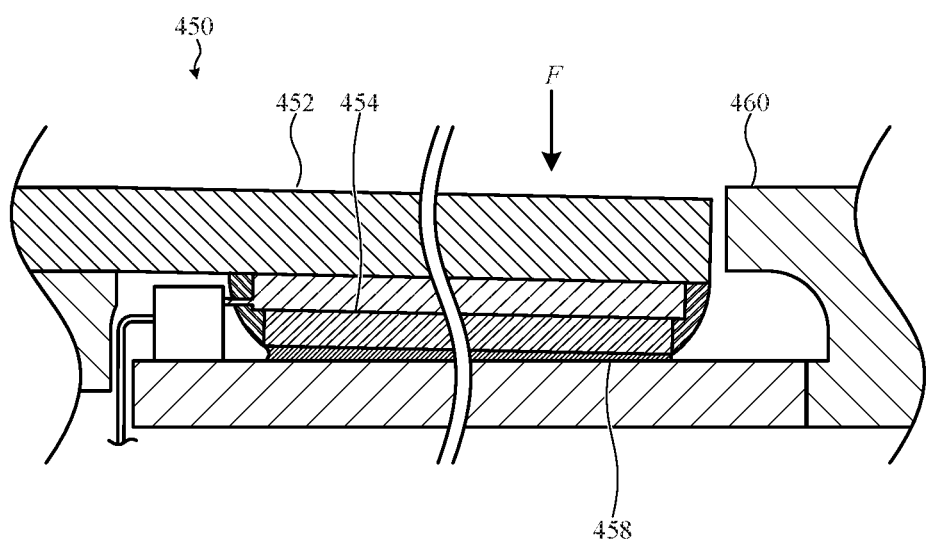

FIGS. 4C and 4D depict an alternative embodiment of an adaptive input row 450 having a cantilevered cover 452. In this configuration, one or more edges or sides of the cover 452 are attached or integrally formed with the housing 460. For example, the cover 452 may be formed from a sheet of glass that is attached to the housing 460 and configured to overhang in a cantilever fashion over the opening 462 in the housing 460. The display 454 may be positioned below the cover 452 and above the force layer 458. A gap 468 may be formed between the cover 452 and an edge of the opening 462 allowing the cover 452 to bow or displace slightly.

As shown in FIG. 4D, a force (F), due to, for example, a forceful touch on the cover 452, may cause the cover 452 to deflect similar to a cantilevered beam. Similar to the previous example, the force layer 458 (or other compliant layer) may deflect slightly in response to the force (F). The depicted deflection is exaggerated to better illustrate the principles of this embodiment. In some implementations, the deflection may be much smaller and the movement of the cover 452 may be imperceptible or virtually imperceptible to a human touch.

Other than the cantilevered cover 452, the other components of the adaptive input row 450 may be as described above with respect to FIGS. 4A and 4B. Redundant descriptions have been omitted for clarity.

Figure 4E:
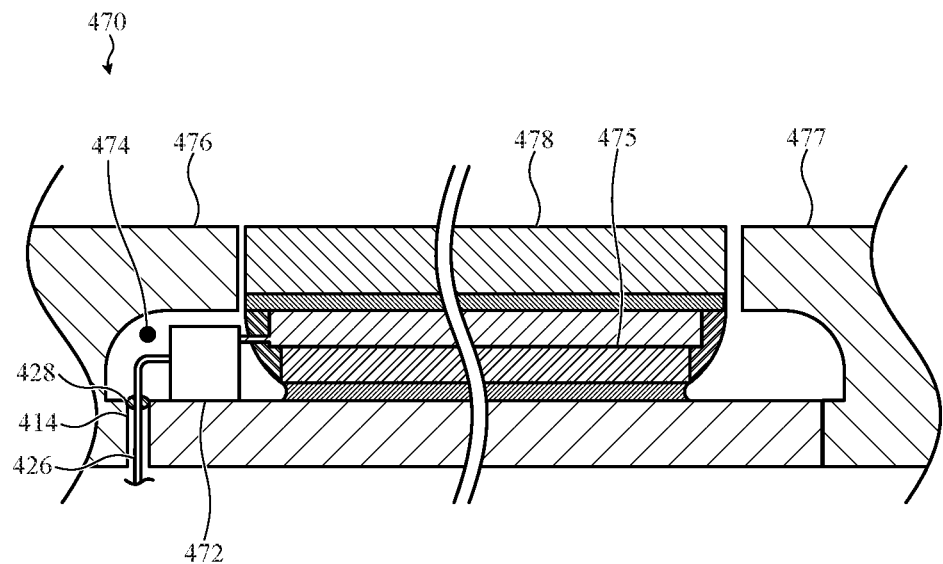
Figure 4F:
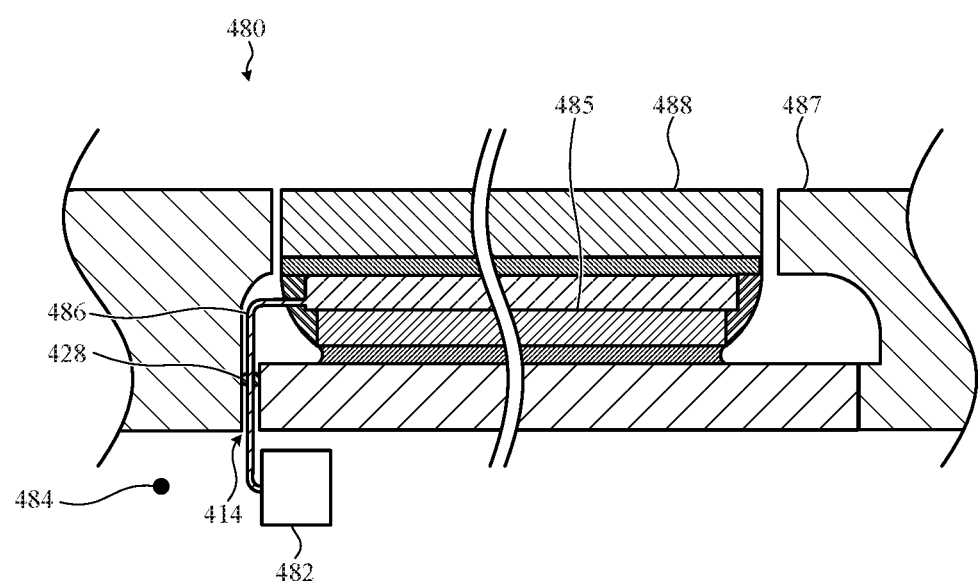

FIGS. 4E and 4F depict alternative configurations for positioning the circuitry that is operatively coupled to elements of the adaptive input row. The examples of FIGS. 4E and 4F may be combined with any one of the adaptive input row embodiments described herein and is not limited to the particular configuration or stackup depicted in FIGS. 4E and 4F.

FIG. 4E depicts an example adaptive input row 470 having circuitry 472 positioned within a cavity 474. As shown in FIG. 4E, the cavity 474 is covered by an extension 476 integrally formed with the housing 477. Thus, the circuitry 472 is positioned below the extension 476 of the housing 477 rather than beneath the cover, as depicted in the examples of FIGS. 4A-4D. In the configuration of FIG. 4E, the cover 478 may be nearly the same size as the display 475 and, thus, the display 475 may be used to provide graphical output for nearly the entire cover 478.

As shown in FIG. 4E, the circuitry 472 may be coupled to one or more separate components by flexible conduit 426. Similar to previous examples, the flexible conduit 426 may enter an interior volume of the housing 477 through passage 414. To prevent the ingress of liquid or other potential contaminants, a gasket or seal 428 may be disposed between the flexible conduit 426 and the passage 414.

FIG. 4F depicts an example adaptive input row 480 having circuitry 482 positioned within an internal volume or region 484 of the housing 487. In the configuration of FIG. 4F, the cover 488 may be nearly the same size as the display 485 and, thus, the display 485 may be used to provide graphical output for nearly the entire cover 488. Another potential advantage is that the housing 477 may be formed to more closely fit the outer dimensions of the adaptive input row 480. As shown in FIG. 4F, the circuitry 472 may be coupled to elements of the stack by the flexible conduit 486. The flexible conduit 486 may enter an interior volume of the housing 487 through passage 414. To prevent the ingress of liquid or other potential contaminants, a gasket or seal 428 may be disposed between the flexible conduit 486 and the passage 414.

Figure 5A:
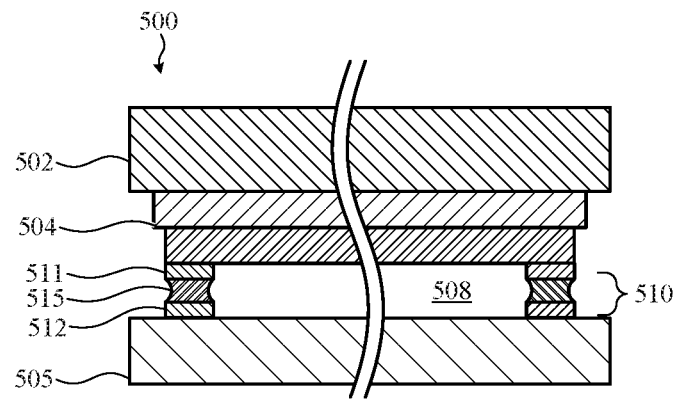
FIG. 5A depicts a side view of an adaptive input row having an example force layer.
Figure 5B:
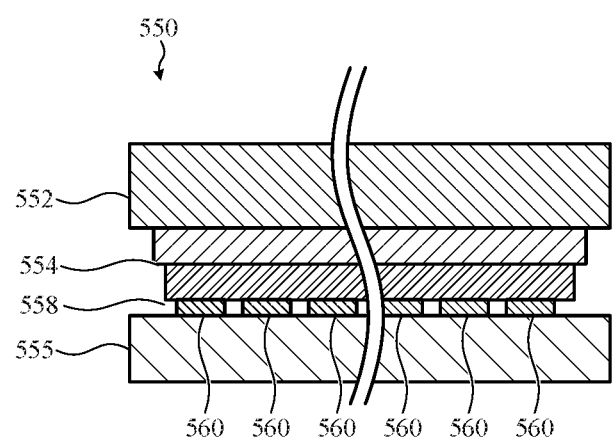
FIG. 5B depicts a side view of an adaptive input row having another example force layer.

FIGS. 5A and 5B depict adaptive input rows having alternative force layers that may be used to estimate the force of a touch. The example force layers of FIGS. 5A and 5B may also be used to estimate the location of a touch, with or without the use of a separate touch sense layer. The embodiments depicted in FIGS. 5A and 5B may be installed or positioned in an opening of a housing similar to the examples described above with respect to FIGS. 4A-4F.

FIG. 5A depicts an example adaptive input row 500 having a cover 502 positioned over a display 504, which may include an OLED display similar to the examples described above with respect to FIGS. 4A-4B. A force layer 508 is positioned below the display 504 on a side opposite the cover 502. The force layer 508 may be supported by structure 505, which may be integrated with the device housing or may be formed from a separate component.

In the example of FIG. 5A, the force layer 508 includes a capacitive-type force-sensing structure 510. Specifically, the force layer 508 includes two force-sensing structures 510 or nodes disposed near opposite ends of the adaptive input row 500. Each force-sensing structure 510 includes an upper capacitive plate or electrode 511 that is separated from a lower capacitive plate or electrode 512 by a compressible layer 515. When a force is applied to the cover 502, one or both of the compressible layers 515 may compress or deflect, which results in the upper electrode 511 moving closer to the lower electrode 512. The amount of deflection may be measured by monitoring or measuring a change in capacitance between the electrodes 511, 512. The estimated amount of deflection may be correlated to an estimated force, which may be used to estimate the force of the touch on the cover 502. Accordingly, the force layer 508 may be used to compute or estimate the magnitude of an applied force on the adaptive input row 500.

Additionally or alternatively, the force layer 508 may be used to estimate a location of the touch along the length of the adaptive input row 500. For example, a relative displacement may be measured or computed between the force-sensing structures 510 positioned on opposite ends of the adaptive input row 500. By comparing the relative displacement between the two force-sensing structures 510, an approximate location of the applied force or touch may be determined. For example, if the displacement of each force-sensitive structure 510 is approximately the same, the location of the touch may be estimated to be near the center of the adaptive input row 500 (provided that the force-sensitive structures 510 are evenly spaced and have nearly the same compressibility). If, however, the displacement of the force-sensitive structure 510 on the left is greater than the displacement of the force-sensitive structure 510 on the right, the location of the touch may be estimated to be toward the left-end of the adaptive input row 500.

The location information provided using the force layer 508 may be used alone or in conjunction with information provided by a separate touch layer to determine the force and location of one or more touches on the adaptive input row 500. The force layer 508 may be particularly beneficial when estimating an amount of force applied by two or more touches on the cover 502. Using location information estimated using a touch layer, the relative displacement of the two force-sensitive structures may be used to estimate an amount of force that is applied by each of the two or more touches.

FIG. 5B depicts an adaptive input row 550 having another example force layer 558 that may be used to estimate a magnitude and/or a location of a force on the adaptive input row 550. Similar to the previous example, the adaptive input row 550 includes a display 554 positioned under a cover 552. The force layer 558 is positioned below the display 554 and supported by structure 555.

In the present embodiment, the force layer 558 includes a linear array of force-sensitive structures or force nodes 560 (referred to herein as nodes). Each of the nodes 560 may be formed from a piezoresistive, piezoelectric, or other strain-sensitive material that is configured to exhibit a change in an electrical property in response to a strain or deflection. Alternatively, each of the nodes 560 may be formed from a capacitive electrode stack, similar to the example described above with respect to FIG. 5A. In particular, each of the nodes 560 may include a pair of capacitive plates or electrodes that are separated by a compressible material that is configured to compress or deflect in response to the force of a touch on the cover 552.

In the example of FIG. 5B, the nodes 560 are arranged in a one-dimensional array along the length of the adaptive input row 550. In some embodiments, the one-dimensional array of nodes 560 is configured to detect a localized deflection of the adaptive input row 550 to estimate both a magnitude of force and a location of the touch. For example, the cover 552, display 554, and any other layers or substrates of the stack may be flexible enough to deflect or bow over a localized region, which may result in fewer than all of the nodes 560 being deflected in accordance with the localized region. In this scenario, it may be advantageous that the structure 555 be substantially rigid and not deflect significantly in response to the force of a touch. In some embodiments, a sub-group of the nodes 560 experiences the localized deflection or bowing of the layers positioned above the force layer 558. Over the sub-group of affected nodes 560, the deflection may be greatest for those nodes 560 closest to the location of the touch. Using the relative deflection or output of the affected nodes 560, the location of the touch may be estimated, as well as the magnitude of the applied force. In a similar fashion, the array of nodes 560 may be used to measure the location and magnitude of multiple touches on the adaptive input row 550.

While FIG. 5B depicts an array of nodes 560 arranged along a single (length) direction, other embodiments may include an array of nodes arranged along two directions (e.g., along both length and width of the adaptive input row similar to as depicted in the force layer 308 of FIG. 3). A two-dimensional node configuration may be used to determine a two-dimensional location of the touch. In particular, a two-dimensional force node array may be used to estimate both a length-wise and width-wise location of a touch.

Figure 6A:
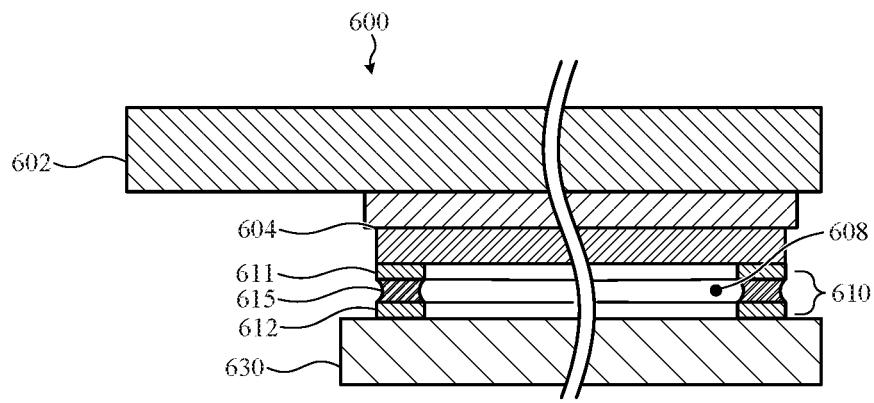
FIGS. 6A-6B depict side views of an adaptive input row having another example force layer.
Figure 6B:
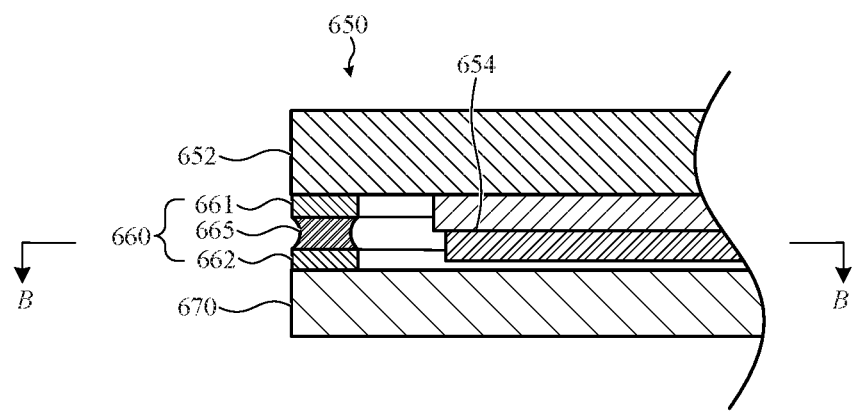
Figure 6C:
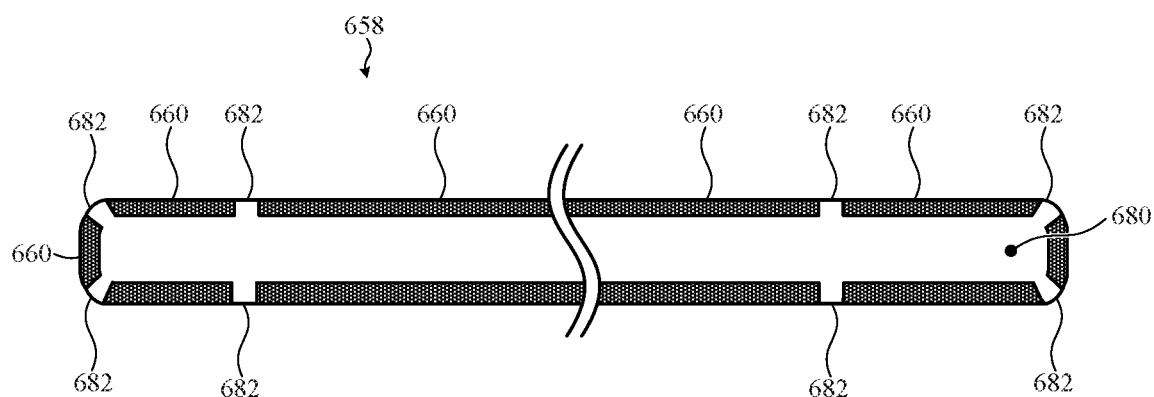
FIG. 6C depicts a cross-sectional view of the example force layers of FIG. 6B.

In some embodiments, a force layer may also function as a seal or barrier to prevent or reduce the ingress of moisture, liquid, or other foreign matter. FIGS. 6A-6C depict example configurations of adaptive input rows having a force layer that is configured to both estimate an applied force and form a gasket or seal around a portion of the adaptive input row. Various components, including a touch layer and other components, are omitted from the simplified illustration of FIGS. 6A-6C for clarity and to reduce redundancy. However, various components and functionality expressly described with respect to other embodiments, including touch sensing and the use of a touch layer, may be combined with the features of FIGS. 6A-6C.

As shown in FIG. 6A, the adaptive input row 600 includes a force layer 608 positioned under a display 604 and cover 602. In the present embodiment, the force layer 608 is formed from a set of capacitive force-sensing structures 610. Each force-sensing structure 610 may include a pair of capacitive plates or electrodes 611, 612 separated by a compressible layer 615. The force-sensing structures 610 may operate in accordance with a capacitive force-sensing scheme consistent with the examples described above with respect to FIGS. 3 and 5A.

In the present embodiment, the force-sensing structures 610 may also form a gasket or seal around a portion of the adaptive input row 600. For example, the force-sensing structures 610 may be bonded or otherwise fixed with respect to adjacent layers (in this case display 604 and support structure 630) using an adhesive or other sealant that is configured to form a liquid-resistant barrier. For example, the set of force-sensing structures 610 may be bonded to a single layer of pressure-sensitive adhesive (PSA) that forms a liquid-resistant barrier on at least that side of the set of force-sensing structures 610. In some embodiments, the adhesive joint may also include an intermediate substrate or layer that facilitates the bond with an adhesive layer. The set of force-sensing structures 610 may be similarly bonded/adhered on both sides to form a substantially liquid-resistant barrier.

Additionally, the compressible layer 615 may also be configured to reduce the risk of contamination. For example, the compressible layer 615 may be formed from a material that acts as a liquid and contaminant barrier as well as provides the desired compressibility for the operation of the force layer 608. In some cases, the compressible layer 615 may be formed from an elastomer material, such as silicone, Viton, Buna-N, ethylene propylene or other similar material. The compressible layer 615 may also be formed from a solid material, a closed-cell foam or other liquid-resistant form of material. The compressible layer 615 may be bonded to or otherwise attached to the pair of electrodes 611, 612 to form a substantially liquid-resistant seal or barrier.

As shown in FIG. 6A, the force-sensing structures 610 encircle a portion of the adaptive input row 600 located under the display 604 and above the support structure 630. The layout or position of the force-sensing structures 610 may be similar to as shown in FIG. 6C (which is a cross-sectional view of the force-sensing structures 660 in FIG. 6B). In particular, each force-sensing structure 610 may form a portion or segment of a wall that functions as a barrier to seal an interior volume or interior portion of the adaptive input row 600.

FIG. 6B depicts an adaptive input row 650 having a display 654 positioned below a cover 652. The adaptive input row 650 also includes a force layer (658 of FIG. 6C), which actually surrounds a region occupied by the display 654. The adaptive input row 650, in this example, is formed around the perimeter of the display 654. The force layer (658 of FIG. 6C) includes a set of force-sensing structures 660 that are positioned between the cover 652 and the support structure 670. By forming the force layer 658 by a series or array of force-sensing structures 660 that are positioned around the perimeter of the display 654, the force layer 658 may form a protective barrier or seal for an internal volume or portion of the adaptive input row 650.

Similar to the previous examples, the force-sensing structures 660 include a pair of capacitive plates or electrodes 661, 662 separated by a compressible layer 665. Similar to the example described above with respect to FIG. 6A, the force-sensing structures 660 may be configured to form a gasket or seal to prevent the ingress of moisture, liquid, or other potential contaminants. In the example of FIG. 6B, the force-sensing structures 660 cooperate to form a seal or gasket around the entire display 654. In some cases, this configuration reduces or eliminates the need to pot or encapsulate the edges of the display 654.

FIG. 6C depicts a cross-sectional view of the force layer 658 of FIG. 6B along section B-B. In the simplified illustration of FIG. 6C, the display 654 and other internal components have been omitted for clarity. In the example of FIG. 6C, the force layer 658 includes multiple force-sensing structures that together form a segmented barrier around the internal volume 680 of the adaptive input row 650. The small gaps 682 between each force-sensing structure 660 or segment may be filled with a sealant or similar material to prevent the ingress of moisture, liquid or other potential contaminants. In some embodiments, the small gaps 682 are filled with the same material that forms the compressible layer 665 of the force-sensing structures 660.

In the configuration of FIG. 6C, the force-sensing structures 660 or segments may be configured to produce a distinct or independent force-sensing output in response to a force of a touch on the cover 652. In some embodiments, the relative output of the force-sensing structures 660 may be used to estimate a location or region of potential locations of the touch. For example, if one or more force-sensing structures 660 toward the right end of the segmented structure experience a greater deflection than force-sensing structures 660 on the left end, the location of the touch(es) may be estimated to be in a region located toward the right-end of the adaptive input row 650. In some embodiments, the force-sensing structures 660 may be used to provide two-dimensional touch or force-location information.

Figure 7:
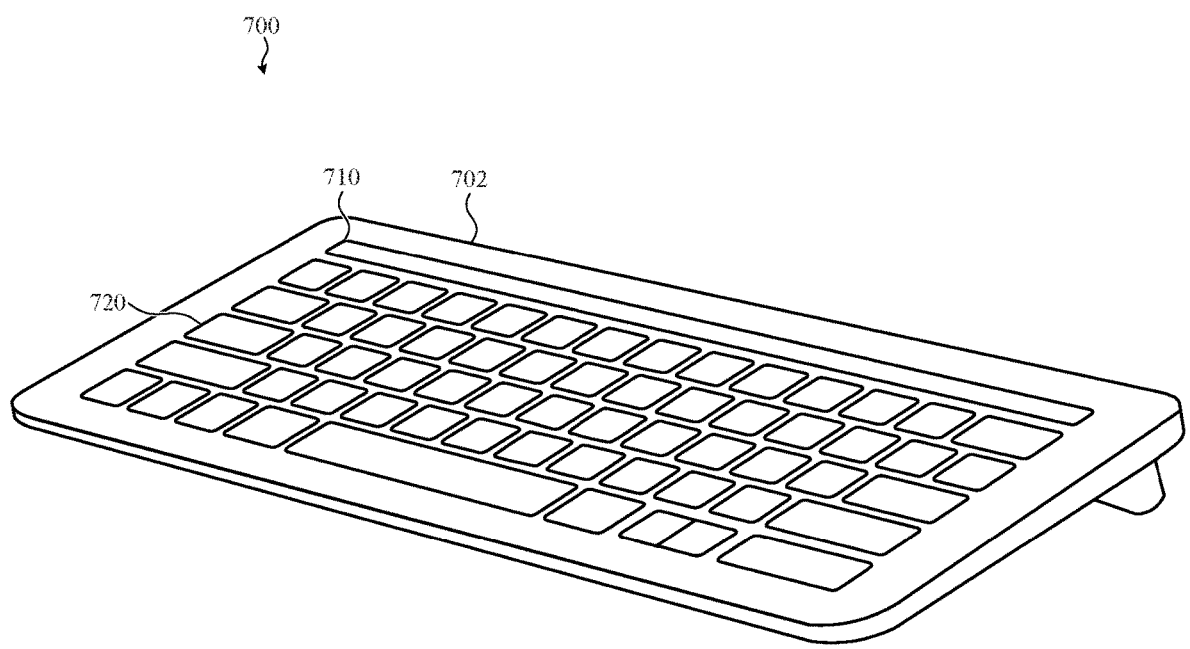
FIG. 7 depicts another example device having an adaptive input row.
Figure 8:
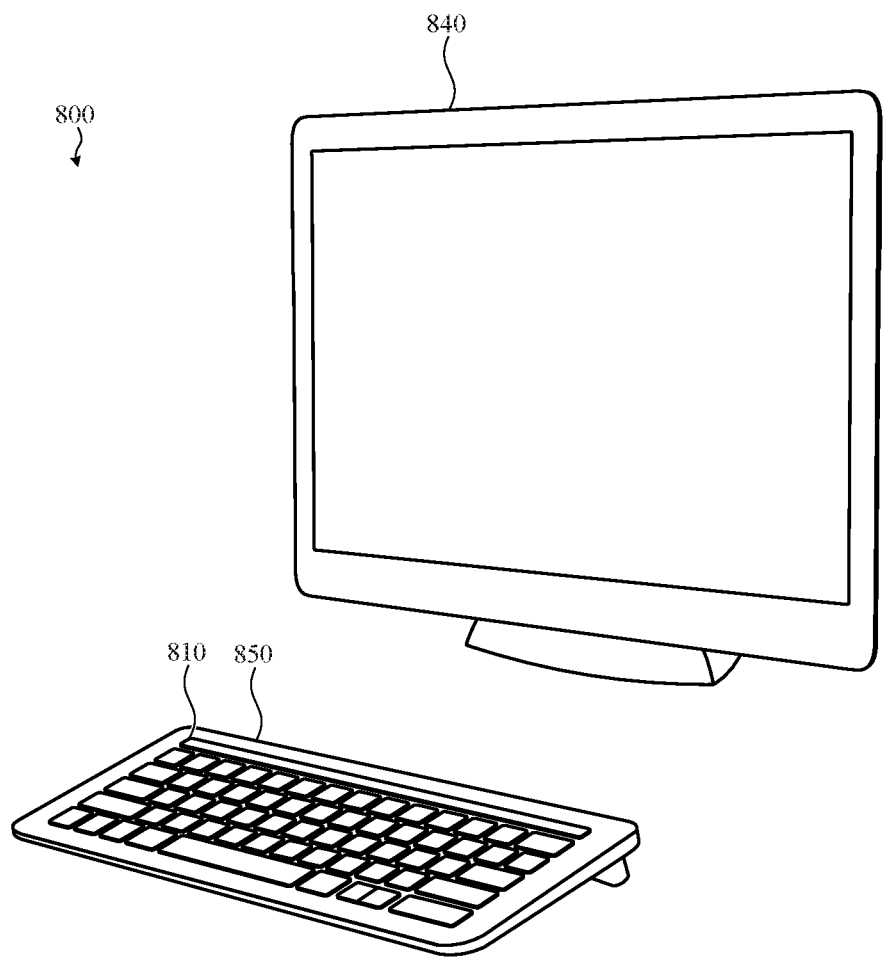
FIG. 8 depicts another example device with an adaptive input row.

FIGS. 7 and 8 depict alternative electronic devices that may include an adaptive input row. In particular, FIG. 7 depicts a keyboard device 700 that includes an adaptive input row 710. The adaptive input row 710 is positioned within an opening in a housing 702 similar to other embodiments described herein. The adaptive input row 710 may have a color and/or finish that matches the color and/or finish of the housing 702. For example, the adaptive input row 710 may be painted or otherwise treated to match the color and appearance of an aluminum or plastic housing 702.

As shown in FIG. 7, the adaptive input row 710 is also located adjacent to a set of keys 720. In some embodiments, the adaptive input row 710 may be located adjacent to a number row of the set of keys 720. The location of the adaptive input row 710 may be similar to the location of a traditional function row of a traditional keyboard layout.

FIG. 8 depicts an example desktop computing device 800 having a keyboard 850 and a display 840. The display 840 may function as a primary display of the device, similar to the primary display described above with respect to FIG. 1. Computing electronics, including one or more processing units and computer memory, may be located in the keyboard device 850, the display 840, and/or a separate enclosed housing or tower not depicted. As shown in FIG. 8, the device 800 includes an adaptive input row 810 located in the housing of the keyboard device 850. The placement and operation of the adaptive input row 810 may be in accordance with the various examples provided herein.

Figure 9:
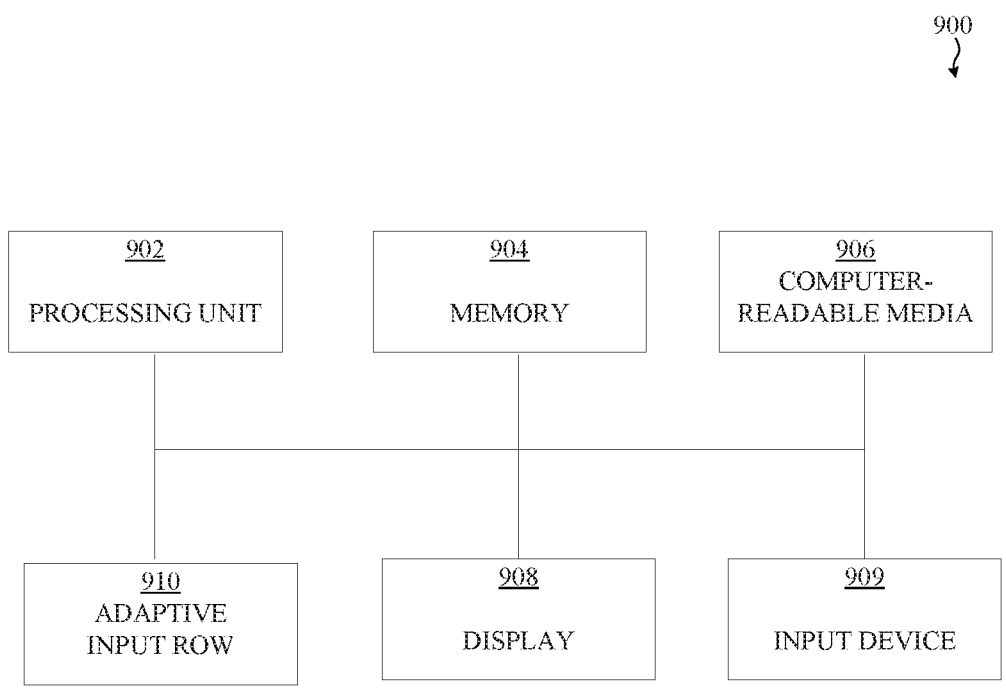
FIG. 9 depicts an example electronic device.

FIG. 9 depicts a schematic representation of an example device having an adaptive input row. The schematic representation depicted in FIG. 9 may correspond to components of the portable electronic device depicted in FIGS. 1, 7, and 8, described above However, FIG. 9 may also more generally represent other types of devices that include an adaptive input row or similar device.

As shown in FIG. 9, a device 900 includes a processing unit 902 operatively connected to computer memory 904 and computer-readable media 906. The processing unit 902 may be operatively connected to the memory 904 and computer-readable media 906 components via an electronic bus or bridge. The processing unit 902 may include one or more computer processors or microcontrollers that are configured to perform operations in response to computer-readable instructions. The processing unit 902 may include the central processing unit (CPU) of the device. Additionally or alternatively, the processing unit 902 may include other processors within the device including application specific integrated chips (ASIC) and other microcontroller devices.

The memory 904 may include a variety of types of non-transitory computer-readable storage media, including, for example, read access memory (RAM), read-only memory (ROM), erasable programmable memory (e.g., EPROM and EEPROM), or flash memory. The memory 904 is configured to store computer-readable instructions, sensor values, and other persistent software elements. Computer-readable media 906 also includes a variety of types of non-transitory computer-readable storage media including, for example, a hard-drive storage device, solid state storage device, portable magnetic storage device, or other similar device. The computer-readable media 906 may also be configured to store computer-readable instructions, sensor values, and other persistent software elements.

In this example, the processing unit 902 is operable to read computer-readable instructions stored on the memory 904 and/or computer-readable media 906. The computer-readable instructions may adapt the processing unit 902 to perform the operations or functions described above with respect to FIGS. 2A-2J. The computer-readable instructions may be provided as a computer-program product, software application, or the like.

As shown in FIG. 9, the device 900 also includes a display 908 and an input device 909. The display 908 may include a liquid-crystal display (LCD), organic light-emitting diode (OLED) display, light-emitting diode (LED) display, or the like. If the display 908 is an LCD, the display may also include a backlight component that can be controlled to provide variable levels of display brightness. If the display 908 is an OLED or LED type display, the brightness of the display 908 may be controlled by modifying the electrical signals that are provided to display elements.

The input device 909 is configured to provide user input to the device 900. The input device 909 may include, for example, a touch screen, touch button, keyboard, key pad, or other touch input device. The device 900 may include other input devices, including, for example, a power button, volume buttons, home buttons, scroll wheels, and camera buttons.

As shown in FIG. 9, the device 900 also includes an adaptive input row 910. The adaptive input row 910 may be operatively coupled to the processing unit 902 and memory 904 in order to provide user input similar to the input device 909. The adaptive input row 910 may also be configured to provide an adaptable display that may be controlled by the processing unit 902 or other aspect of the device 900. In general, the adaptive input row 910 may be configured to operate in accordance with the various examples provided herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable computing system comprising: a housing having a first portion pivotally coupled to a second portion by a hinge; a set of alpha-numeric keys positioned within the second portion of the housing; and an adaptive input row positioned between the set of alpha-numeric keys and the hinge and comprising: a cover; a display positioned below the cover and configured to: display a first set of indicia when the portable computing system is operated in a first mode; and display a second set of indicia when the portable computing system is operated in a second mode, the first set of indicia including an indicium configured to be animated along a path across the display between a first region of the display and a second region of the display, wherein the first region is an inactive touch region and the second region is an active touch region, the indicium configured to prompt or guide a user to provide a touch gesture input along the path; and a sensor positioned below the cover and configured to detect a location of a touch on the cover, wherein: output from the sensor is interpreted as a first set of commands when in the first mode; and output from the sensor is interpreted as a second set of commands when in the second mode.

2. The portable computing system of claim 1, wherein:
the first set of indicia includes a first symbol;
the second set of indicia includes a second symbol;
the first and second symbols occupy a shared region of the display; and at least one symbol of the first set of indicia does not change when the portable computing system transitions from the first mode to the second mode.

3. The portable computing system of claim 2, further comprising a track pad positioned adjacent a side of the set of alpha-numeric keys that is opposite the adaptive input row.

4. The portable computing system of claim 1, wherein the adaptive input row includes a touch-sensitive region that extends beyond a display region illuminated by the display.

5. The portable computing system of claim 1, wherein:
the adaptive input row defines a third region; and
in response to the touch being located within the third region, the adaptive input row is operable to change the display from the first set of indicia to a third set of indicia.

6. The portable computing system of claim 5, wherein:
a set of programmably defined regions is defined along a length of the adaptive input row; and
the first and second sets of indicia are displayed over a same set of programmably defined regions.

7. The portable computing system of claim 5, wherein the sensor is configured to differentiate between:
a touch gesture input in which the touch is moved across at least a portion of the cover;
a forceful touch input in which the touch exerts a force that exceeds a threshold; or
a multi-touch input in which multiple touches contact the cover.

8. An electronic device comprising: a housing having a first portion pivotally coupled to a second portion by a hinge: a primary display positioned within the first portion of the housing; a processing unit positioned within the second portion of the housing and operably coupled to the primary display; a keyboard having a set of mechanical keys positioned within the second portion of the housing; and an adaptive input row positioned within the second portion of the housing between the set of mechanical keys and the hinge, the adaptive input row comprising: a cover forming a portion of an exterior surface of the electronic device; and a display positioned below the cover; wherein the processing unit is configured to: cause a display of a user interface for a software application on the primary display; and cause a set of indicia to be displayed on the display of the adaptive input row, the set of indicia corresponding to one or more commands associated with the user interface of the software application and being modifiable in response to a movement of an object across the set of indicia, the set of indicia being animated along a path across the display of the adaptive input row between a first region and a second region, wherein the first region is an inactive touch region and the second region is an active touch region, the set of indicia prompting or guiding a user to provide a touch gesture input that moves along the path.

9. The electronic device of claim 8, wherein:
the set of indicia is a first set of indicia;
the user interface is a first user interface of a first software application;
the one or more commands is a first set of commands;
the processing unit is further configured to cause a second set of indicia to be displayed on the display of the adaptive input row; and
the second set of indicia corresponds to a second set of commands associated with a second user interface of a second software application.

10. The electronic device of claim 9, wherein:
the user interface includes a symbol that correspond to a respective one of the one or more commands; and
an indicia of the first set of indicia includes an indicia symbol that corresponds to the symbol.

11. The electronic device of claim 9, wherein an indicia of the first set of indicia changes when application not displayed.

12. The electronic device of claim 8, wherein:
the set of indicia is a first set of indicia;
the one or more commands is a first set of commands associated with a software-dependent input mode;
the processing unit is further configured to cause a second set of indicia to be displayed on the display of the adaptive input row; and
the second set of indicia corresponds to a second set of commands associated with a hardware-dependent input mode.

13. The electronic device of claim 10, wherein:
the user interface corresponds to an e-mail application;
the symbol includes an envelope symbol; and
the indicia symbol includes the envelope symbol.

14. The electronic device of claim 12, wherein:
the user interface corresponds to a document viewer application;
the symbol includes a scrolling symbol; and
the indicia symbol includes the scrolling symbol.

15. A laptop computer comprising:
a housing including an upper housing portion and a lower housing portion, the upper and lower housing portions being connected to each other by a hinge;
a processing unit located in the housing;
a set of mechanical keys in a keyboard positioned within the lower housing portion; and
an adaptive input row positioned along a side of the set of mechanical keys adjacent to the hinge, the set of mechanical keys comprising:
a display configured to display a set of indicators over a set of programmably defined regions; and
a sensor configured to detect a touch input on a surface of the adaptive input row;
wherein the processing unit is configured to distinguish between a gesture input and a touch input on the surface of the adaptive input row, the processing unit being configured to animate a first indicator of the set of indicators across the display along a path between a first region and a second region, the first indicator prompting or guiding a user to provide a touch gesture input along the path toward the second region, the processing unit being configured to move a second indicator of the set of indicators in response to gesture input being provided along the surface of the adaptive input row;
wherein the first region is an inactive touch region and the second region is an active touch region.

16. The laptop computer of claim 15, wherein the second indicator includes a slider having a translating slider node.

17. The laptop computer of claim 15, wherein the gesture input is a multi-touch input gesture.

18. The laptop computer of claim 15, wherein the processing unit is further configured to distinguish between the touch input, the gesture input, and a force input.

19. The portable computing system of claim 1, wherein the processing unit is configured to distinguish between a gesture input and a touch input on the surface of the adaptive input row, the indicium configured to prompt or guide a user to provide a gesture input along the path to provide input at the second region.

20. The portable computing system of claim 19, wherein a processing unit is configured to move an indicator along the path in response to the gesture input provided along the path.

\* \* \* \* \*